(12) United States Patent
Shimizu et al.

(10) Patent No.: US 6,386,668 B1
(45) Date of Patent: May 14, 2002

(54) INK JET RECORDING APPARATUS

(75) Inventors: Megumi Shimizu, Mishima; Atsushi Kubota, Shizuoka-ken; Hidehiro Watanabe, Tokyo; Takahisa Ikeda, Mishima, all of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/338,969

(22) Filed: Jun. 24, 1999

(30) Foreign Application Priority Data

Jun. 30, 1998 (JP) .......................... 10-185202
Feb. 23, 1999 (JP) .......................... 11-044743

(51) Int. Cl.$^7$ .......................... B41J 29/38; B41J 2/205; B41J 2/145; B41J 2/15
(52) U.S. Cl. .......................... 347/13; 347/15; 347/41
(58) Field of Search .......................... 347/13, 15, 41, 347/42, 43, 201; 400/82

(56) References Cited

U.S. PATENT DOCUMENTS

| | | | |
|---|---|---|---|
| 5,384,587 A | * | 1/1995 | Takagi et al. .................. 347/41 |
| 5,450,099 A | * | 9/1995 | Stephenson et al. ......... 347/200 |
| 5,696,542 A | * | 12/1997 | Matsubara et al. ............ 347/12 |
| 5,734,393 A | * | 3/1998 | Erikson ........................ 347/41 |
| 6,059,397 A | * | 5/2000 | Jones ............................ 347/41 |

FOREIGN PATENT DOCUMENTS

| | | | |
|---|---|---|---|
| EP | 0 034060 A1 | * 8/1981 | .............. B41J/3/04 |
| EP | 693 380 A | 1/1996 | ............ B41J/2/515 |
| EP | 0 914 950 A | * 5/1999 | ............ B41J/2/155 |
| JP | 4-361052 | 12/1992 | ............ B41J/2/205 |
| WO | 97/31781 | 9/1997 | ............ B41J/2/505 |

* cited by examiner

*Primary Examiner*—John Barlow
*Assistant Examiner*—Alfred E. Dudding
(74) *Attorney, Agent, or Firm*—Frishauf, Holtz, Goodman, Langer & Chick, P.C.

(57) ABSTRACT

In an ink jet recording apparatus having two head units, each having a large number of ink nozzles arranged in a line, assembled so that they overlap with each other, an 8-shade image signal is entered into a correction circuit and a line direction position signal is input into a position signal decision circuit. When the position signal decision circuit decides that the position signal represents the overlapping zone of the head units, the shade level of the image signal is divided between the head units. For example, when the shade level of the image signal is 7, one of the head units is allotted the shade level and the other is allotted the shade level. The overlapping nozzles in a pair eject droplets of ink to form one dot.

14 Claims, 17 Drawing Sheets

|   | a | b | c | d | e | f |
|---|---|---|---|---|---|---|
| 0 | 0 | 0 | 0 | 0 | 0 | 0 |
| 1 | 1 | 1 | 1 | 0 | 0 | 0 |
| 2 | 1 | 1 | 1 | 1 | 1 | 1 |
| 3 | 2 | 2 | 2 | 1 | 1 | 1 |
| 4 | 3 | 2 | 2 | 2 | 2 | 1 |
| 5 | 4 | 3 | 3 | 2 | 2 | 1 |
| 6 | 5 | 4 | 3 | 3 | 2 | 1 |
| 7 | 6 | 5 | 4 | 3 | 2 | 1 |

— 411

| | a~c | d~f |
|---|---|---|
| 0 | 0 | 0 |
| 1 | 1 | 0 |
| 2 | 1 | 1 |
| 3 | 2 | 1 |
| 4 | 3 | 1 |
| 5 | 4 | 1 |
| 6 | 5 | 1 |
| 7 | 6 | 1 |

511a

| | a~c | d~f |
|---|---|---|
| 0 | 0 | 0 |
| 1 | 1 | 0 |
| 2 | 1 | 1 |
| 3 | 2 | 1 |
| 4 | 2 | 2 |
| 5 | 3 | 2 |
| 6 | 4 | 2 |
| 7 | 5 | 2 |

511b

| | a~c | d~f |
|---|---|---|
| 0 | 0 | 0 |
| 1 | 1 | 0 |
| 2 | 1 | 1 |
| 3 | 2 | 1 |
| 4 | 2 | 2 |
| 5 | 3 | 2 |
| 6 | 3 | 3 |
| 7 | 4 | 3 |

511c

| | a, c | b, d | e, g | f, h |
|---|---|---|---|---|
| 0 | 0 | 0 | 0 | 0 |
| 1 | 1 | 1 | 0 | 0 |
| 2 | 1 | 2 | 0 | 1 |
| 3 | 2 | 0 | 2 | 1 |
| 4 | 3 | 1 | 2 | 1 |
| 5 | 4 | 2 | 2 | 1 |
| 6 | 5 | 3 | 2 | 1 |
| 7 | 6 | 4 | 2 | 1 |
| 8 | 7 | 5 | 2 | 1 |
| 9 | 8 | 6 | 2 | 1 |
| 10 | 9 | 7 | 2 | 1 |
| 11 | 10 | 8 | 2 | 1 |
| 12 | 11 | 9 | 2 | 1 |
| 13 | 12 | 10 | 2 | 1 |
| 14 | 13 | 11 | 2 | 1 |
| 15 | 14 | 12 | 2 | 1 |
FIG. 20
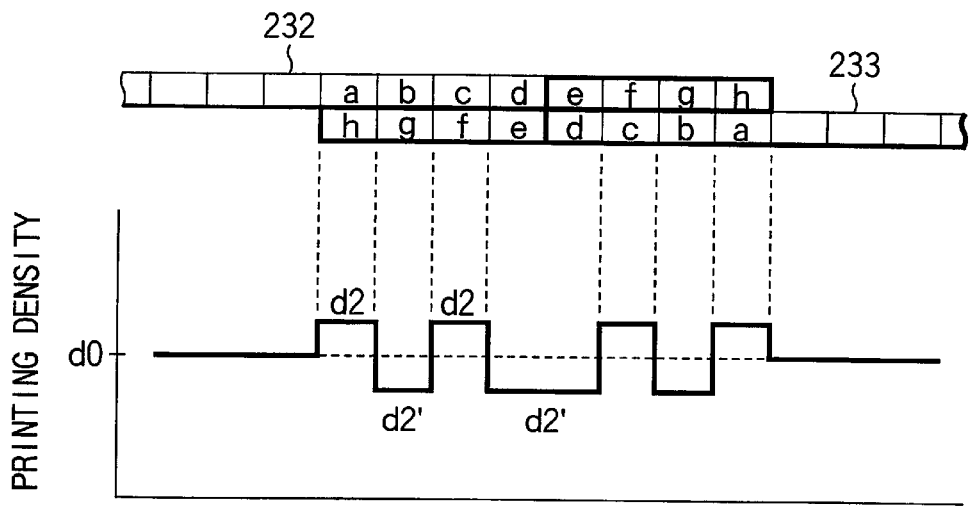
FIG. 21
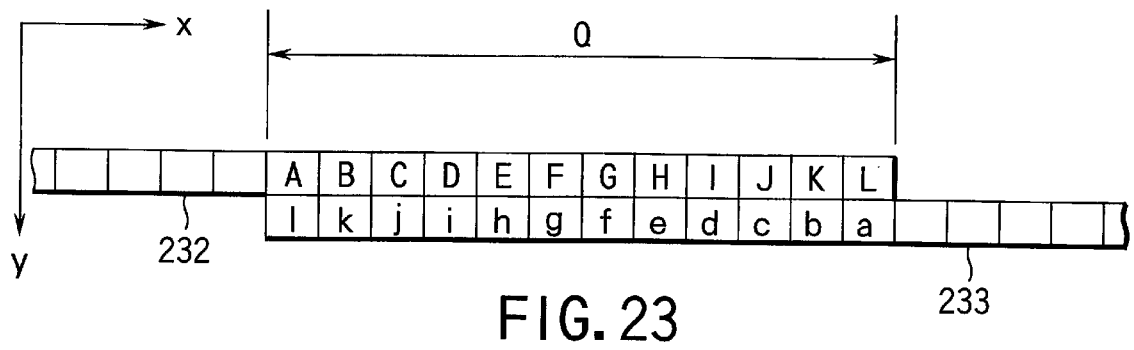
FIG. 23

FIG. 26A (711a)

| | A~D | E,G | F,H | I,K | J,L | l~i | h,f | g,e | d,b | c,a |
|---|---|---|---|---|---|---|---|---|---|---|
| 0 | 0 | 0 | 0 | 0 | 0 | 0 | 0 | 0 | 0 | 0 |
| 1 | 1 | 1 | 1 | 0 | 0 | 0 | 0 | 0 | 1 | 1 |
| 2 | 2 | 1 | 2 | 0 | 1 | 0 | 1 | 0 | 2 | 1 |
| 3 | 3 | 2 | 0 | 2 | 1 | 0 | 1 | 2 | 0 | 2 |
| 4 | 4 | 3 | 1 | 2 | 1 | 0 | 1 | 2 | 1 | 3 |
| 5 | 5 | 4 | 2 | 2 | 1 | 0 | 1 | 2 | 2 | 4 |
| 6 | 6 | 5 | 3 | 2 | 1 | 0 | 1 | 2 | 3 | 5 |
| 7 | 7 | 6 | 4 | 2 | 1 | 0 | 1 | 2 | 4 | 6 |
| 8 | 8 | 7 | 5 | 2 | 1 | 0 | 1 | 2 | 5 | 7 |
| 9 | 9 | 8 | 6 | 2 | 1 | 0 | 1 | 2 | 6 | 8 |
| 10 | 10 | 9 | 7 | 2 | 1 | 0 | 1 | 2 | 7 | 9 |
| 11 | 11 | 10 | 8 | 2 | 1 | 0 | 1 | 2 | 8 | 10 |
| 12 | 12 | 11 | 9 | 2 | 1 | 0 | 1 | 2 | 9 | 11 |
| 13 | 13 | 12 | 10 | 2 | 1 | 0 | 1 | 2 | 10 | 12 |
| 14 | 14 | 13 | 11 | 2 | 1 | 0 | 1 | 2 | 11 | 13 |
| 15 | 15 | 14 | 12 | 2 | 1 | 0 | 1 | 2 | 12 | 14 |

FIG. 26B (711b)

| | A,B | C,E | D,F | G,I | H,J | K,L | l,k | j,h | i,g | f,d | e,c | b,a |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1 | 1 | 1 | 0 | 0 | 0 | 0 | 0 | 0 | 1 | 1 | 1 |
| 2 | 2 | 1 | 2 | 0 | 1 | 0 | 0 | 1 | 0 | 2 | 1 | 2 |
| 3 | 3 | 2 | 0 | 2 | 1 | 0 | 0 | 1 | 2 | 0 | 2 | 3 |
| 4 | 4 | 3 | 1 | 2 | 1 | 0 | 0 | 1 | 2 | 1 | 3 | 4 |
| 5 | 5 | 4 | 2 | 2 | 1 | 0 | 0 | 1 | 2 | 2 | 4 | 5 |
| 6 | 6 | 5 | 3 | 2 | 1 | 0 | 0 | 1 | 2 | 3 | 5 | 6 |
| 7 | 7 | 6 | 4 | 2 | 1 | 0 | 0 | 1 | 2 | 4 | 6 | 7 |
| 8 | 8 | 7 | 5 | 2 | 1 | 0 | 0 | 1 | 2 | 5 | 7 | 8 |
| 9 | 9 | 8 | 6 | 2 | 1 | 0 | 0 | 1 | 2 | 6 | 8 | 9 |
| 10 | 10 | 9 | 7 | 2 | 1 | 0 | 0 | 1 | 2 | 7 | 9 | 10 |
| 11 | 11 | 10 | 8 | 2 | 1 | 0 | 0 | 1 | 2 | 8 | 10 | 11 |
| 12 | 12 | 11 | 9 | 2 | 1 | 0 | 0 | 1 | 2 | 9 | 11 | 12 |
| 13 | 13 | 12 | 10 | 2 | 1 | 0 | 0 | 1 | 2 | 10 | 12 | 13 |
| 14 | 14 | 13 | 11 | 2 | 1 | 0 | 0 | 1 | 2 | 11 | 13 | 14 |
| 15 | 15 | 14 | 12 | 2 | 1 | 0 | 0 | 1 | 2 | 12 | 14 | 15 |

FIG. 26C (711c)

| | A,C | B,D | E,G | F,H | I~L | l,j | k,i | h,f | g,e | d~a |
|---|---|---|---|---|---|---|---|---|---|---|
| 0 | 0 | 0 | 0 | 0 | 0 | 0 | 0 | 0 | 0 | 0 |
| 1 | 1 | 1 | 0 | 0 | 0 | 0 | 0 | 1 | 1 | 1 |
| 2 | 1 | 2 | 0 | 1 | 0 | 1 | 0 | 2 | 1 | 2 |
| 3 | 2 | 0 | 2 | 1 | 0 | 1 | 2 | 0 | 2 | 3 |
| 4 | 3 | 1 | 2 | 1 | 0 | 1 | 2 | 1 | 3 | 4 |
| 5 | 4 | 2 | 2 | 1 | 0 | 1 | 2 | 2 | 4 | 5 |
| 6 | 5 | 3 | 2 | 1 | 0 | 1 | 2 | 3 | 5 | 6 |
| 7 | 6 | 4 | 2 | 1 | 0 | 1 | 2 | 4 | 6 | 7 |
| 8 | 7 | 5 | 2 | 1 | 0 | 1 | 2 | 5 | 7 | 8 |
| 9 | 8 | 6 | 2 | 1 | 0 | 1 | 2 | 6 | 8 | 9 |
| 10 | 9 | 7 | 2 | 1 | 0 | 1 | 2 | 7 | 9 | 10 |
| 11 | 10 | 8 | 2 | 1 | 0 | 1 | 2 | 8 | 10 | 11 |
| 12 | 11 | 9 | 2 | 1 | 0 | 1 | 2 | 9 | 11 | 12 |
| 13 | 12 | 10 | 2 | 1 | 0 | 1 | 2 | 10 | 12 | 13 |
| 14 | 13 | 11 | 2 | 1 | 0 | 1 | 2 | 11 | 13 | 14 |
| 15 | 14 | 12 | 2 | 1 | 0 | 1 | 2 | 12 | 14 | 15 |

INK JET RECORDING APPARATUS

BACKGROUND OF THE INVENTION

The present invention relates to an ink jet recording apparatus which uses an ink jet head having a number of ink nozzles arranged and drives the ink jet head via an image signal to cause selectively the ink nozzles to eject droplets of ink onto paper for recording.

One ink jet recording apparatus is an on-demand ink jet printer. With such a type of ink jet printer, it is important to increase the speed of operation. The more ink nozzles in the ink jet head, the faster we can make printing. A technique to increase the number of ink nozzles is forming a long ink jet head by combining integrally a plurality of head units each having a large number of ink nozzles arranged in a line with the arrangement of the ink nozzles in each head unit substantially parallel with that in every other head unit. A line head is formed by making the head length equal to the width of recording paper, permitting fast printing.

The head unit is composed, as shown in FIG. 29, of a nozzle section 2 provided with a large number of ink chambers 1, a body section 4 provided with a common ink chamber 3 for supplying ink to each ink chamber 1, and an ink supply pipe 5 for supplying ink to the common ink chamber 3. Causing a volume change to occur in each ink chamber 1 allows a droplet of in ejected from a corresponding one of ink nozzles 6, thereby making dot printing. The vacant ink chamber 1 is replenished with ink by the common ink chamber 3.

Systems for causing a volume change to occur in the ink chambers 1 include piezoelectric control systems that make use of deformation of piezoelectric members and-heat control systems that make use of heat generated by heating elements. The use of such control systems to cause a volume change to occur in each ink chamber in an arbitrary fashion allows printing on demand.

At the time of ink ejection, the volume change in an ink chamber 1 is also transferred to the common ink chamber 3 in the form of a change in pressure. As a result, ink chambers 1 situated at the head ends will be greatly affected by the common ink chamber 3 when a number of ink chambers eject ink, so that the volume of ink ejected from a certain number of ink chambers situated near and at the head ends increases.

In the case of an ink jet head consisting of a single head unit, even if the volume of ink ejected from a certain number of ink chambers at the end portions of the head changes -and consequently there is some-change in printing density, the resulting irregularities in density is difficult to notice because the change in printing density occurs at the ends of a line of printing. In contrast, in the case of an ink jet head in which a plurality of head units are arranged in the direction of their length, the ends of head units adjacent to each other are located midway on a line of printing. The irregularities in the density in those portions will appear noticeably in the form of lines.

For example, as shown in FIG. 30, when an ink jet head in which head units 7 and 8 are arranged in the direction of their length in non-overlapping fashion is driven by an image signal at a fixed level, the volume of ink projected from ink nozzles 7a and 8a in the boundary portion between the head units increases, resulting in a sharp increase in printing density from d0 to d1. This produces noticeable irregularities in printing density in the form of a line.

BRIEF SUMMARY OF THE INVENTION

It is an object of the present invention to provide an ink jet recording apparatus using an ink jet head assembly constructed from a plurality of head units arranged such that every two adjacent head units overlap with each other, which allows irregularities in printing density resulting from variations in the volume of ejected ink from ending ink nozzles of each head unit to be reduced and irregularities in printing density in line form extending in the direction in which a recording medium moves to be reduced.

According to the present invention, there is provided an ink jet recording apparatus comprising: an ink jet head formed from a plurality of head units each having a large number of ink nozzles arranged in a line, the head units being arranged such that they are substantially parallel to one another in the direction of arrangement of their ink nozzles and, in the direction in which a recording medium moves, every two adjacent head units overlap with each other by a number Q of ink nozzles including a number P (Q>P≧1) of ending ink nozzles that may cause a change in printing density; and drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged, the driving means controlling the ink jet head so that one dot is formed by ink ejection from each ink nozzle of one head unit in the overlapping zone of the adjacent head units and the corresponding one of the other head unit and the ratio in the amount of ejected ink of one to the other of overlapping ink nozzles is made variable so that the average printing density in the overlapping zone of the head units varies at a fixed rate.

Thus, the present invention allows an ink jet head assembly constructed from a plurality of head units arranged in the direction of their length to reduce irregularities in printing density resulting from variations in the volume of ejected ink from ending ink nozzles of each head unit. In addition, irregularities in printing density in line form extending in the direction in which a recording medium moves can be reduced, thereby further improving the recording quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 20 shows the contents of the lookup table in the correction circuit of FIG. 19;

FIG. 21 shows variations in printing density in the ink nozzle overlapping zone of the head units in the third embodiment;

FIG. 23 shows the arrangement of ink nozzles in the overlapping zone of the head units in accordance with a fourth embodiment of the present invention;

FIGS. 26A, 26B and 26C show the contents of tables making up the lookup table in the correction circuit of FIG. 25;

FIGS. 28A and 28B show the arrangement of ink nozzles of the overlapping head units and shade levels printed by the respective ink nozzles after correction;

DETAILED DESCRIPTION OF THE INVENTION

The preferred embodiments of the present invention will be described in detail with reference to the accompanying drawings.

First Embodiment

Figure 1:
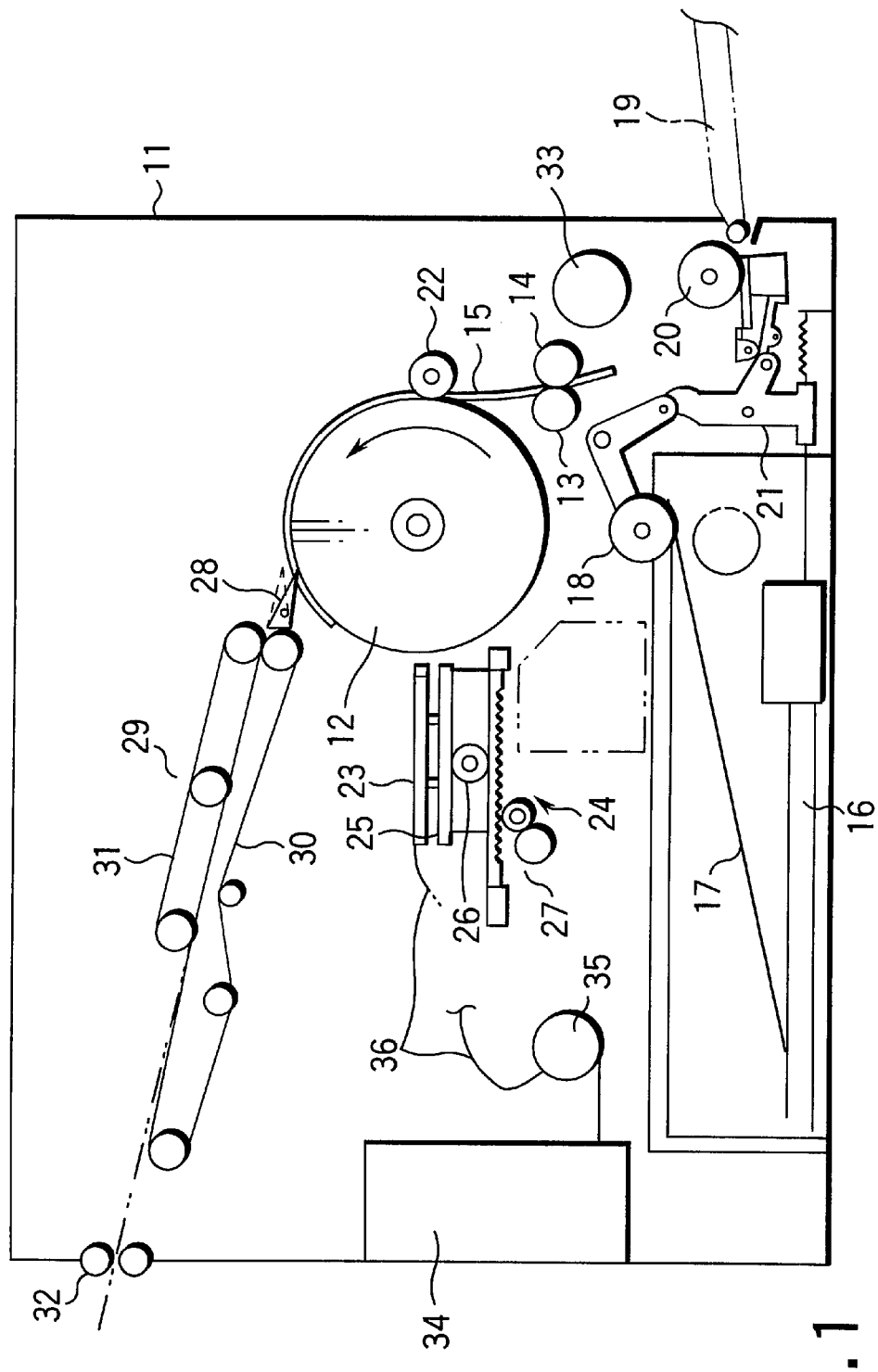
FIG. 1 shows a configuration of an ink jet recording apparatus in accordance with a first embodiment of the present invention.

In FIG. 1 there is illustrated the configuration of the entire ink jet recording apparatus, in which a drum 12 is provided in a container 11 that rotates at a fixed circumferential speed in a direction indicated by an arrow to take up recording paper 15 fed through rollers 13 and 14.

A paper feed cassette 16 is provided at the bottom of the container 11. Sheets of recording paper are placed on a plate 17 of the cassette and fed, one at a time, to the rollers 13 and 14 by a roller 18. In addition, a sheet of recording paper manually supplied from a manual feed tray 19 removably mounted to the side of the container 11 is fed to the rollers 13 and 14 by a roller 20. The switching between paper feeding by the roller 18 and paper feeding by the roller 20 is made by feed switching means 21.

An electrification roller 22 is positioned to be opposed to the drum 15, which allows the recording paper 15 fed by the rollers 13 and 14 to be attracted to the drum surface. A printing mechanism 24 is placed opposed to the drum 12, which is equipped with an ink jet recording head 23 that has a number of recording elements arranged in line and can be moved in the direction of the axis of rotation of the drum 12 which is coincident with the direction in which the recording elements of the recording head 23 are arranged. Thus, the recording paper 15 is carried with the rotation of the drum 12 in the direction perpendicular to the direction of arrangement of the recording elements of the ink jet recording head.

Figure 2:
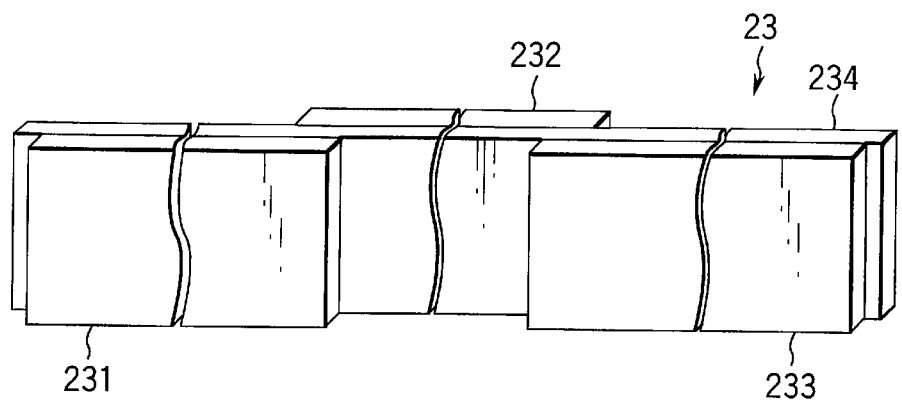
FIG. 2 is a perspective view of an ink jet head assembly used in the first embodiment.
Figure 3:
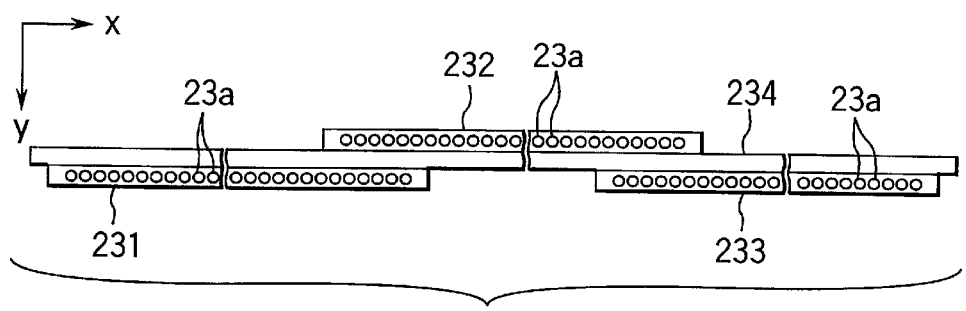
FIG. 3 shows a positional relationship among ink nozzles of head units of the ink jet head in the first embodiment.
Figure 4:
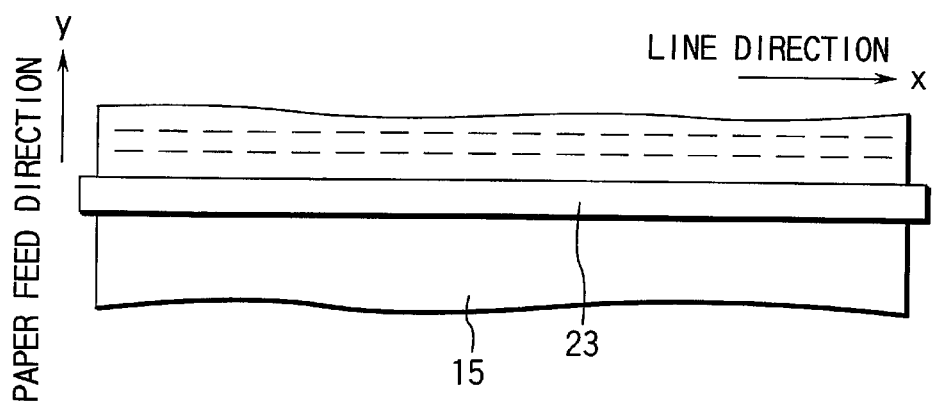
FIG. 4 shows the paper feed direction with respect to the ink jet head.

As shown in FIGS. 2 and 3, the ink jet recording head 23 comprises three head units 231, 232 and 233, each having a large number of ink nozzles 23a arranged in line at a given pitch, which are adhered to a common plate 234. More specifically, the head unit 232 is adhered to one surface of the plate 234 in its central portion, while the head units 231 and 233 are adhered to the opposite surface on the end sides thereof. The head unit 232 and the head units 231 and 233 are positioned such that the end portions of the head units 231 and 232 overlap in the direction y perpendicular to the line direction x in which the nozzles are arranged by six (=Q) ink nozzles including, for example, three (=P) ink nozzles that may produce a change in printing density and likewise the end portions of the head units 232 and 233 overlap in the direction y by six ink nozzles.

The ink nozzles 23a in each of the head units 231 and 233 and the ink nozzles 23a in the head unit 232 are not arranged in a horizontal line. That is, the head units 231 and 232 (232 and 233) are offset with respect to each other in the direction y. However, it is easy to provide the same print results as it would be obtained if the ink nozzles of the head units 231, 232 and 233 were arranged in a line by adjusting the timing of ink projection from each of the head units.

The print mechanism 24 comprises a reciprocating mechanism 25 on which the ink jet recording head 23 is placed, a motor unit 26 having a linear motor and a reciprocating rod, and a head moving means 27. The head moving means 27 moves the head 23 relative to the drum 12. The motor unit 26 moves the reciprocating mechanism 25 in the direction of axis of rotation of the drum 12 so as to allow the head 23 to travel and back in the direction of axis of rotation of the drum.

The drum 12 is equipped with a separation claw that release the recording paper from the drum surface. The released recording paper is fed to a recording paper eject mechanism 29. The eject mechanism comprises a belt conveyor 30 that is brought into contact with the non-recording surface of the recording paper 15 and a pressing means 31 that presses the recording paper against the belt conveyor.

In the upper portion of a side of the container 11 is placed eject rollers 32 that eject the recording paper 15 carried on the belt conveyor to outside. In addition, there are housed in the container 11 a main motor 33, and ink cassette 34 serving as an ink supply source, an ink buffer 35 that temporarily stores ink from the ink cassette, and an ink supply tube 36 that supplies ink stored in the ink buffer 35 to the ink jet recording head 23.

At the time of printing, a sheet of recording paper is taken out of the feed cassette 16 by the roller 18 and then sent to the feed rollers 13 and 14. The sheet of recording paper is taken up by the rotating drum 12 and then attracted to the drum surface by the electrification roller 22.

With the rotation of the drum 12, the recording paper is rotated in the direction y perpendicular to the line direction x in which the ink nozzles of the ink jet recording head 23 are arranged. In response to an image signal, droplets of ink are projected selectively from the ink nozzles onto the recording paper, thereby making an image recording. Since the pitch of the ink nozzles of the ink jet recording head is coarse in comparison with the resolution of image recording, the ink jet recording head is controlled to shift in the direction of axis of rotation of the drum by, for example, ½ of the ink nozzle pitch when the drum makes one rotation. That is, two rotations of the drum completes printing on one sheet of recording paper, allowing image recording at a resolution corresponding to twice the pitch of the ink nozzles. The recording paper which has image recording made is released from the drum surface by the crawl 28 and then ejected to outside by the eject mechanism 2.

Figure 5:
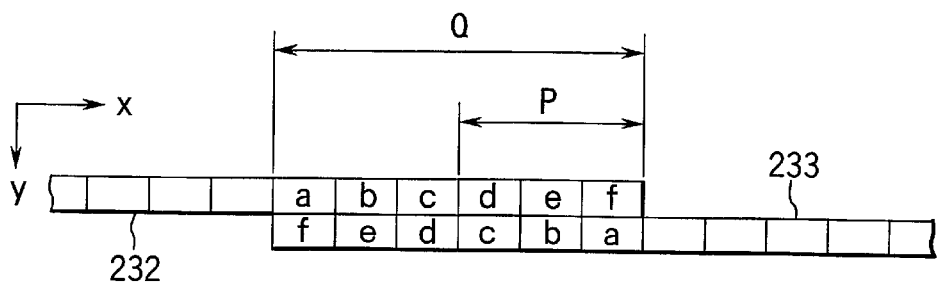
FIG. 5 shows the arrangement of ink nozzles in the overlapping zone of the head units.

In FIG. 5, the overlapping zone of the head units 232 and 233 (i.e., the boundary portion between the units) is shown enlarged. The head units 232 and 233 overlap with each other by six ink nozzles. Of six ink nozzles a, b, c, d, e, and f at one end of the head unit 232 (corresponding to the Q number of ink nozzles), three endmost nozzles d, e, and f correspond to the P number of ink nozzles that may produce a change in density. Likewise, of six ink nozzles f, e, d, c, b, and a at one end of the head unit 233 (corresponding to the Q number of endmost ink nozzles), three endmost nozzles f, e, and d correspond to the P number of ink nozzles that may produce a change in density.

Figure 6:
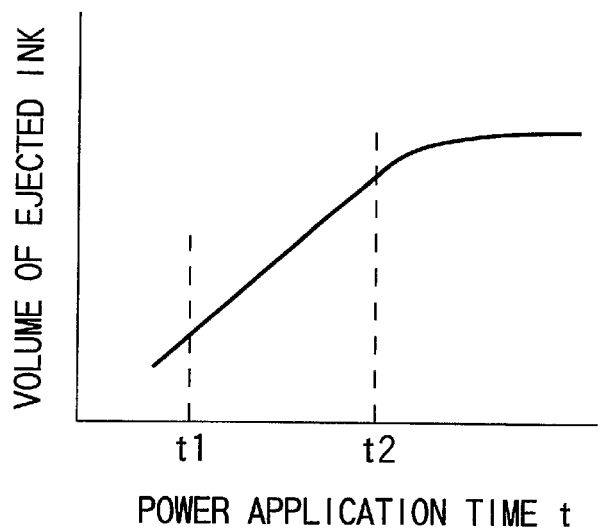
FIG. 6 shows volume of ejected ink versus power application time.

As shown in FIG. 6, the volume of ejected ink from each ink nozzle of the head units 231, 232 and 233 can be varied by varying the time t that the power is applied to the corresponding ink chamber. The time interval from t1 to t2 during which the volume of ejected ink is proportional to the power application time is divided into seven equal time periods to obtain the smallest period of time as a unit and then the power application time is varied from t1 to t2 in units of the smallest period of time. This provides printing control at shade levels of 1 to 7. The inclusion of the shade level 0 involving no ink ejection allows printing control at 8 shade levels. The pseudo-halftoning of an input image signal can provide an image signal adapted for printing at shade levels of 0 to 7.

Figure 7:
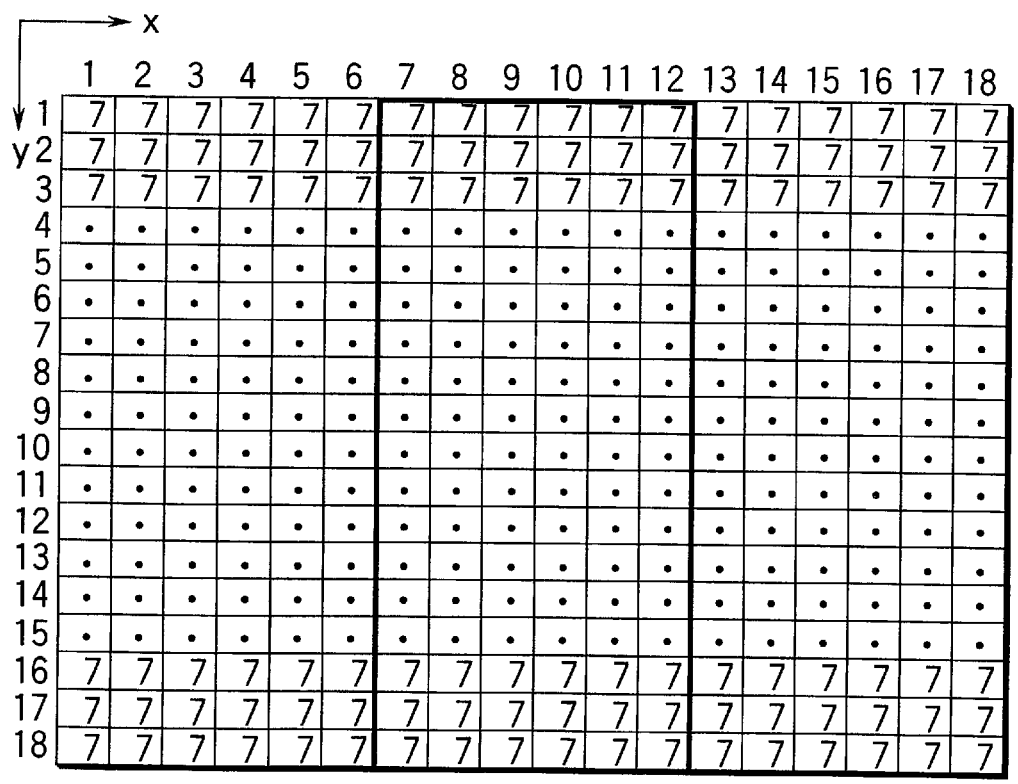
FIG. 7 shows an example of an input image signal in the first embodiment.

FIG. 7 shows an example of an input image signal for printing at the shade level 7 applied to 18 ink nozzles including the six ink nozzles in the overlapping zone of the head units 232 and 233. The six seventh to twelfth ink nozzles in the central portion correspond to the ink nozzles a, b, c, d, e, f of the head unit 232 and the ink nozzles f, e, d, c, b, a of the head unit 233.

For printing at the shade level 7, assume that the ink nozzles a, b, c, d, e, f of the head unit 232 are set to printing at the shade level 7 and the ink nozzles f, e, d, c, b, a of the head unit 233 are set to printing at the shade level 0. Then, there arises the possibility that the three ending ink nozzles d, e, f of the head unit 232 may produce a sharp increase in printing density. In such case, irregularities in density will appear in the form of stripe in the y direction perpendicular to the line direction x. Conversely, even if the ink nozzles a, b, c, d, e, f of the head unit 232 are set to printing at the shade level 0 and the ink nozzles f, e, d, c, b, a of the head unit 233 are set to printing at the shade level 7, there also arises the possibility that the three ending ink nozzles f, e, d of the head unit 233 may produce a sharp increase in printing density. In this case as well, irregularities in density will likewise appear in the form of stripe in the y direction.

In view of these problems, the embodiment makes a decision of whether an input image signal adapted for eight shades is directed to the ink nozzles a through f in the overlapping zone of the head units 232 and 233 and, if so, distributes that input image signal to the head units 232 and 233 so that each of the ink nozzles a through f of the head unit 232 and the corresponding one of the ink nozzles f through a of the head unit 233, i.e., each pair of overlapping ink nozzles, form one dot. Each of the ink nozzles other than the overlapping ink nozzles a through f is individually controlled by the image signal as hitherto.

Figure 8:
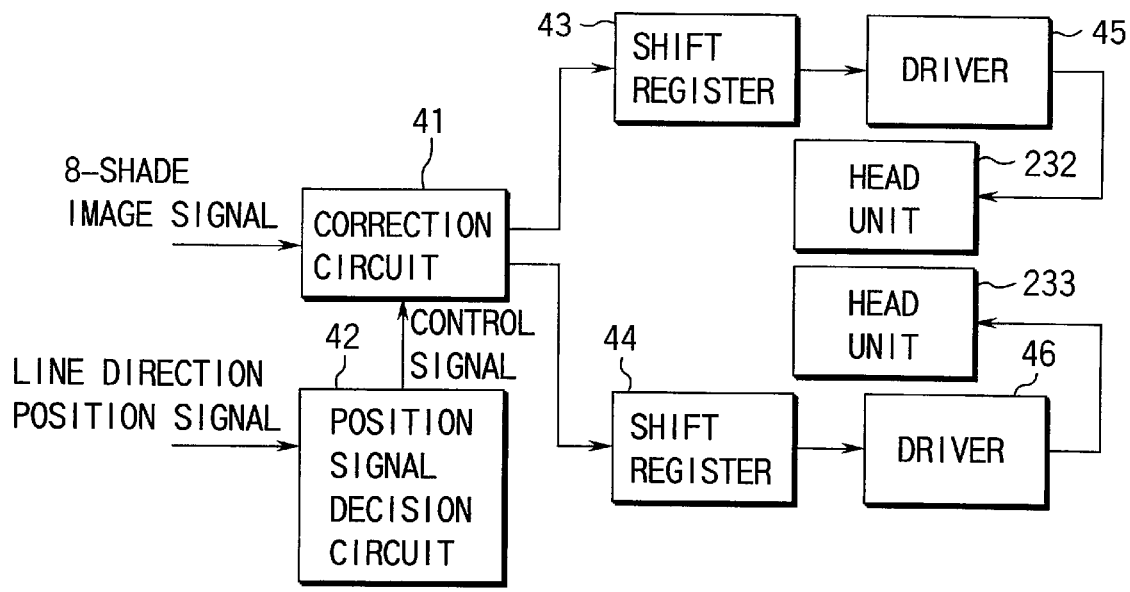
FIG. 8 shows essential circuit components in the first embodiment.

FIG. 8 is a block diagram of a control circuit that implements such shading control. An 8-shade image signal is applied to a correction circuit 41 and a position signal representing the position in the line direction x is applied to a position signal decision circuit 42. The position signal decision circuit makes a decision of whether the input position signal represents the overlapping zone of the head units 232 and 233 and applies a control signal to the correction circuit 41.

Figure 9:
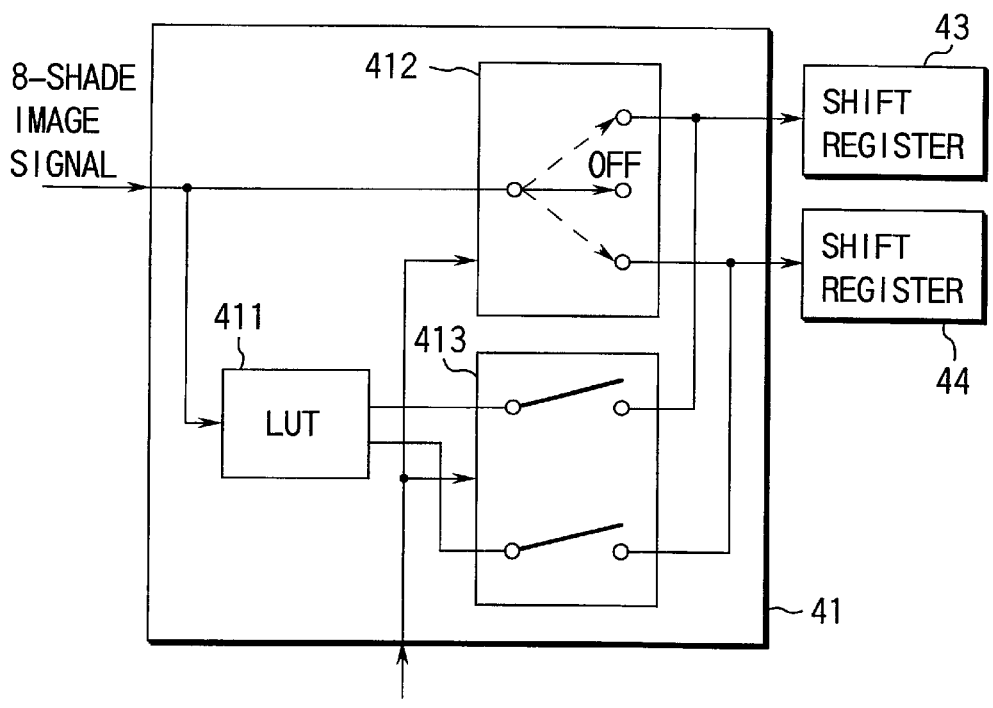
FIG. 9 shows the arrangement of the correction circuit of FIG. 8.
Figures 10, 11:
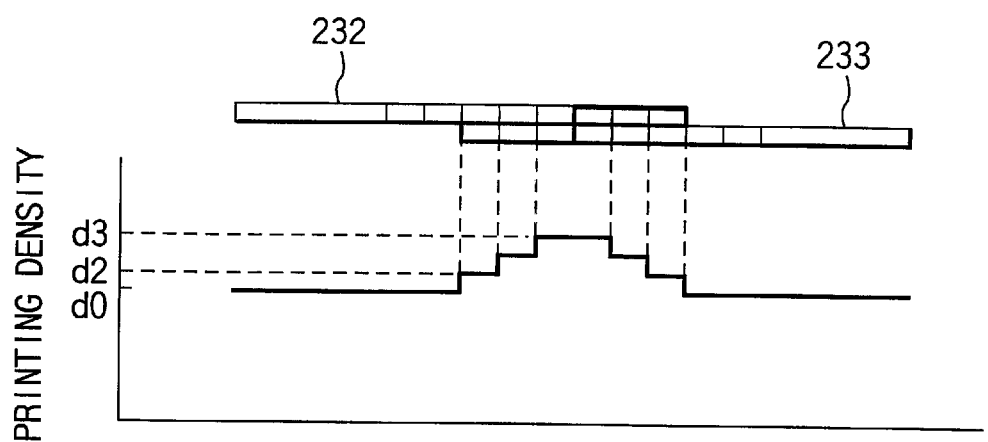
FIG. 10 shows the contents of the lookup table in the correction circuit of FIG. 9.
FIG. 11 shows variations in printing density in the ink nozzle overlapping zone of the head units.

The correction circuit 41 is composed, as shown in FIG. 9, of a lookup table (LUT) 411, a first switch circuit 412 that is used when no shading control is performed, and a second switch circuit 413 that is used when shading control is performed. As shown in FIG. 10, the lookup table 411 stores information representing how an input shade level ranging from 0 to 7 is converted to an output shade level for each of the overlapping ink nozzles a, b, c, d, e, and f of the head units 232 and 233.

The first switch circuit 412 is of a change-over switch type and controlled by the control signal from the position signal decision circuit 42. When the position signal decision circuit decides that the position signal represents other positions than the overlapping zone, the first switch circuit applies the image signal to either a first shift register corresponding to the head unit 232 or a second shift register 44 corresponding to the head unit 233. On the other hand, when the position signal decision circuit decides that the position signal represents the overlapping zone, the first switch circuit is placed to the OFF position by the control signal.

The second switch circuit 413 comprises two single-pole single-throw type ganged switches which are simultaneously turned ON or OFF by the control signal from the position signal decision circuit 42. When the position signal decision circuit decides that the position signal represents other positions than the overlapping nozzle, the second switch circuit is turned OFF. On the other hand, when the position signal decision circuit decides that the position signal represents the overlapping zone, the second switch circuit is turned ON by the control signal to thereby apply first and second outputs of the lookup table 411 to the first and second shift registers 43 and 44, respectively.

The output of the first shift register 43 is applied to a first driver circuit 45 which drives the head unit 232. The output of the second shift register 44 is applied to a second driver circuit 46 to drive the head unit 232.

In such a configuration, suppose that an image signal at the shade level 7 is applied through 18 successive lines to a total of 18 ink nozzles including and centered at the six ink nozzles a through f in the overlapping zone of the head units 232 and 233. The 18 ink nozzles are described as the first through eighteenth ink nozzles.

First, on the first line, using the first through the sixth ink nozzle the head unit 232 alone makes printing. In this case, the first switch circuit 412 is operated by the control signal from the position signal decision circuit 42 to send an 8-shade image signal to the first shift register 43, while the second switch circuit 413 is turned OFF. At this time, therefore, the image signal passes through the correction circuit 41 as it is and then enters the first shift register 43.

For the seventh through the twelfth ink nozzle, the head units 232 and 233 overlap with each other in the paper feed direction y. In the overlapping zone, ink ejection from the head unit 232 and ink ejection from the head unit 233 are combined to form one dot; thus, the first switch circuits 412 and 413 are turned OFF and ON, respectively, by the control signal from the position signal decision circuit 42. In this case, the image signal is distributed between the head units 232 and 233 through the use of the lookup table 411.

When the 8-shade image signal corresponds to the ink nozzle a of the head unit 232 and the ink nozzle f of the head unit 233, the first output of the lookup table is applied to the first shift register 43 as an image signal at the shade level 6 and the second output of the lookup table is applied to the second shift register 44 as an image signal at the shade level 1.

Likewise, when the 8-shade image signal corresponds to the ink nozzle b of the head unit 232 and the ink nozzle e of the head unit 233, the first output of the lookup table is applied to the first shift register 43 as an image signal at the shade level 5 and the second output of the lookup table is applied to the second shift register 44 as an image signal at the shade level 2.

When the 8-shade image signal corresponds to the ink nozzle c of the head unit 232 and the ink nozzle d of the head unit 233, the lookup table first output is applied to the first shift register 43 as an image signal at the shade level 4 and the second output is applied to the second shift register 44 as an image signal at the shade level 3. When the 8-shade image signal corresponds to the ink nozzle d of the head unit 232 and the ink nozzle c of the head unit 233, the first output is applied to the first shift register 43 as an image signal at the shade level 3 and the second output is applied to the second shift register 44 as an image signal at the shade level 4.

When the 8-shade image signal corresponds to the ink nozzle e of the head unit 232 and the ink nozzle b of the head unit 233, the first output of the lookup table is applied to the first shift register 43 as an image signal at the shade level 2 and the second output of the lookup table is applied to the second shift register 44 as an image signal at the shade level 5. When the 8-shade image signal corresponds to the ink nozzle f of the head unit 232 and the ink nozzle a of the head unit 233, the first output of the lookup table is applied to the first shift register 43 as an image signal at the shade level 1 and the second output of the lookup table is applied to the second shift register 44 as an image signal at the shade level 6.

For the thirteenth through the eighteenth ink nozzle, the head unit 233 makes printing by itself. In this case, the first switch circuit 412 is switched by the control signal from the position signal decision circuit 42 to send the 8-shade image signal to the second shift register 44, while the second switch circuit 413 is turned OFF. At this time, therefore, the image signal passes through the correction circuit 41 as it is and then enters the second shift register 44.

In this manner, when the image signal for the first line has been fed into the first and second shift registers 43 and 44, the first and second driver circuits 45 and 46 drive the head units 232 and 233, respectively, thereby allowing ink to be ejected from each ink nozzle. Of course, since the head units 232 and 233 are offset with respect to each other in the y direction, the timing of ink ejection is adjusted so that printing is made as a line. Upon termination of printing of the first line, the same processing is performed for the second line and then repeated until the eighteenth line is completed.

Figures 12A, 12B:
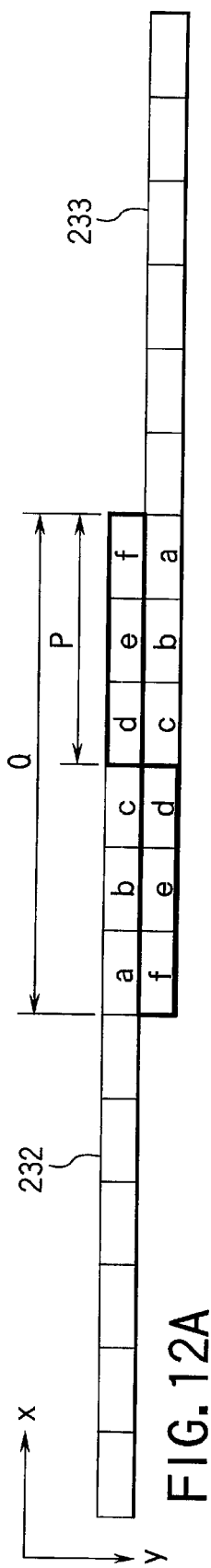
FIGS. 12A and 12B show the arrangement of ink nozzles of the overlapping head units and shade levels printed by the respective ink nozzles after correction.

FIG. 12 shows the distribution of shades between the head units 232 and 233 for the first through the eighteenth ink nozzle on the first through the eighteenth line. For the first through the sixth ink nozzle, the shade distribution between the head units 232 and 233 is (7, 0) for all the 18 lines, indicating that the head unit 232 makes printing by itself.

For the seventh ink nozzle, the shade distribution is (6, 1) for all the 18 lines, indicating that printing at the shade level 6 by the head unit 232 and printing at the shade level 1 by the head unit 233 are combined to form one dot. For the eighth ink nozzle, the shade distribution is (5, 2) for all the 18 lines, indicating that printing at the shade level 5 by the head unit 232 and printing at the shade level 2 by the head unit 233 are combined to form one dot. For the ninth ink nozzle, the shade distribution is (4, 3) for all the 18 lines, indicating that printing at the shade level 4 by the head unit 232 and printing at the shade level 3 by the head unit 233 are combined to form one dot.

For the tenth ink nozzle, the shade distribution between the head units is (3, 4) for all the 18 lines, indicating that printing at the shade level 3 by the head unit 232 and printing at the shade level 4 by the head unit 233 are combined to form one dot. For the eleventh ink nozzle, the shade condition is (2, 5) for all the 18 lines, indicating that printing at the shade level 2 by the head unit 232 and printing at the shade level 5 by the head unit 233 are combined to form one dot. For the twelfth ink nozzle, the shade distribution is (1, 6) for all the 18 lines, indicating that printing at the shade level 1 by the head unit 232 and printing at the shade level 6 by the head unit 233 are combined to form one dot.

For the thirteenth through the eighteenth ink nozzle, the shade distribution between the head units is (0, 7) for all the 18 lines, indicating that the head unit 233 makes printing by itself.

Such printing control allows the printing density in the overlapping zone of the head units 232 and 233 to increase gradually with a small variation width of d0 to d2 and then decrease gradually with the same variation width as shown in FIG. 11. Moreover, d3, the maximum change from d0, is also small in comparison with the conventional change d1 shown in FIG. 30. That is, the endmost ink nozzle f of each of the head units 232 and 233 that is the most greatly affected by the change in the volume of ejected ink is set to the shade level 1, i.e., to eject the smallest amount of ink. On the other hand, the ink nozzle a that forms a dot together with the ink nozzle f and has little variation in the volume of ejected ink is set to the shade level 6 so that the whole density becomes the shade level 7. Thus, the change in printing density can be minimized. The ink nozzles e and d of the head units 232 and 233 that may be affected by the change in the volume of ejected ink are set to the shade levels 2 and 3, respectively, while their respective corresponding ink nozzles b and c that have little variation in the volume of ejected ink are set to the shade levels 5 and 4, respectively. In this case as well, the whole density is set to the shade level 7, thus minimizing the change in printing density.

Thus, the change in printing density at the ends of the head units can be reduced by making the amount of ejected ink variable so that, in the ink nozzles a through f of the head units 232 and 233 that overlap in the direction y perpendicular to the line direction x, the nearer the ink nozzle is to the head unit end, the smaller the amount of ink it ejects. Thereby, the irregularities in density can be reduced and the recording quality can be improved overall.

Although the reduction of irregularities in density in the overlapping zone of the head units 232 and 233 was described here, it goes without saying that exactly the same image signal processing can be applied to the overlapping zone of the head units 231 and 232 to reduce irregularities in density.

Second Embodiment

This embodiment will also be described taking, by way of example, ink ejection control for 18 ink nozzles including and centered at six ink nozzles in the overlapping zone of the head units 232 and 233. Like reference numerals are used to denote the corresponding parts to those in the first embodiment and the differences from the first embodiment will be described.

Figure 13:
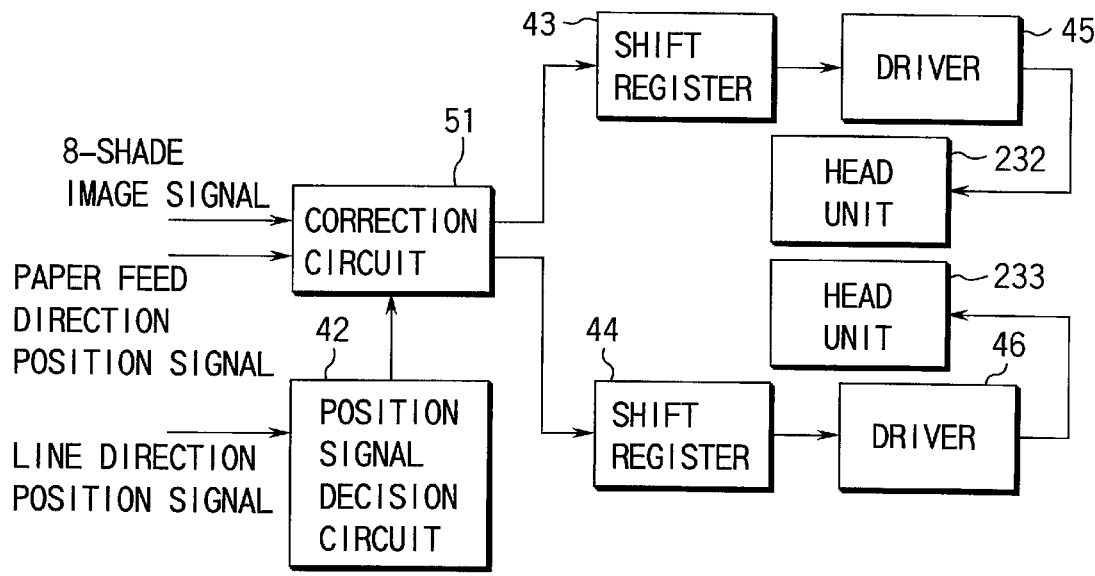
FIG. 13 shows essential circuit components in a first embodiment of the second embodiment.

As shown in FIG. 13, an 8-shade image signal and a paper feed direction (y) position signal are applied to a correction circuit 51 and a line direction (x) position signal is applied to the position signal decision circuit 42.

Figure 14:
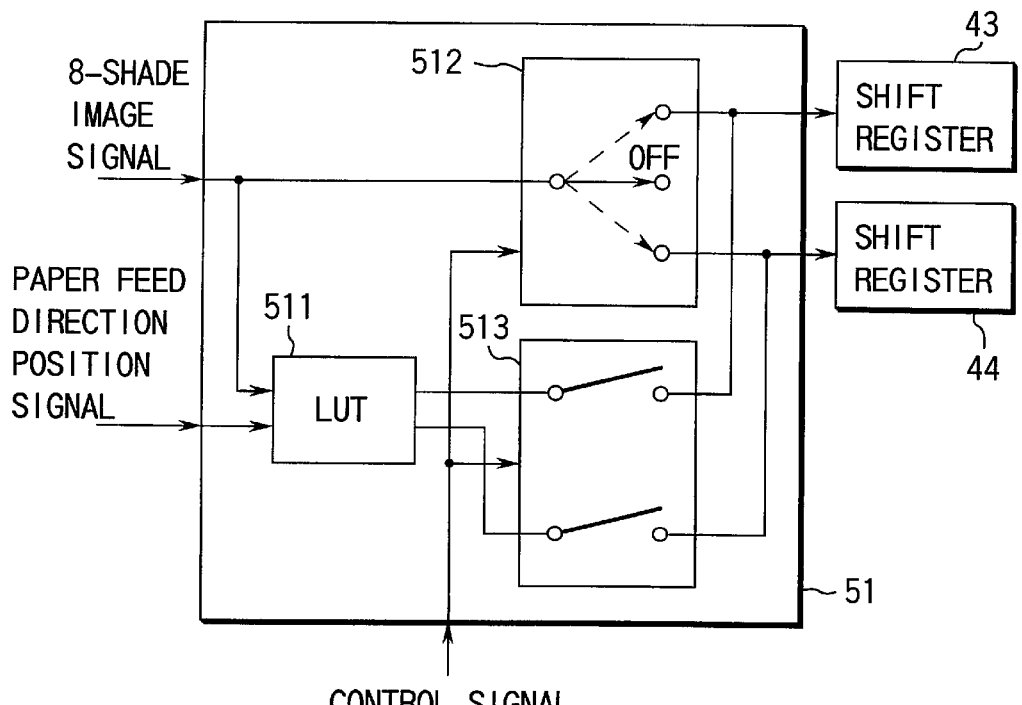
FIG. 14 shows the arrangement of the correction circuit of FIG. 13.

The correction circuit 51 consists, as shown in FIG. 14, of a lookup table (LUT) 511, a first switch circuit 512 which is used when no shade control is performed, and a second switch circuit 513 which is used when the shade control is used. The lookup table 511 is comprised, as shown in FIGS. 15A, 15B and 15C, of three tables 511a, 511b and 511c each of which stores information representing how an input shade level in the range from 0 to 7 is converted to an output shade level for each of the overlapping ink nozzles a, b, c, d, e, and f of the head units 232 and 233.

Figures 15A, 15B, 15C, 17:
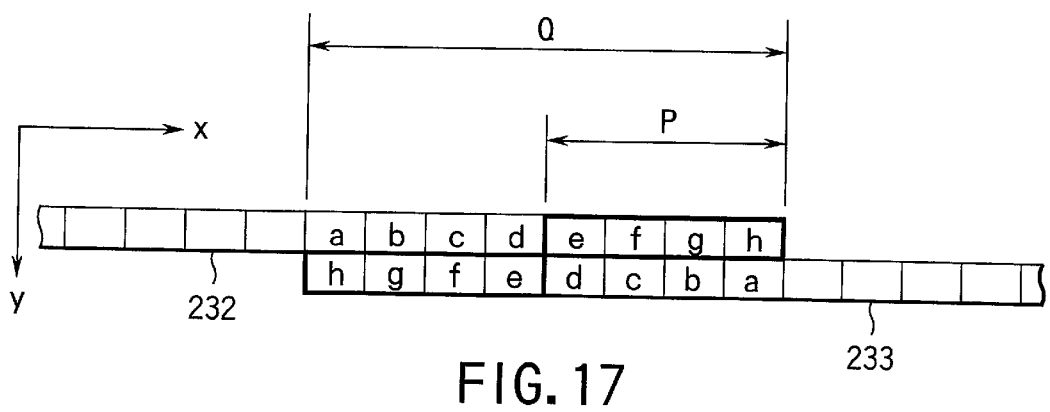
FIGS. 15A, 15B and 15C show the contents of tables in the lookup table of FIG. 14.
FIG. 17 shows the arrangement of ink nozzles in the overlapping zone of the head units in accordance with a third embodiment of the present invention.

The table 511a shown in FIG. 15A is selected when the position y(p) in the paper feed direction y that the input paper feed direction position signal specifies is y(p)=3n−2 (n=1, 2, 3, . . . ), that is, when the position signal specifies the first line, the fourth line, the seventh line, . . . The table 511b shown in FIG. 15B is selected when y(p)=3n−1, that is, when the position signal specifies the second line, the fifth line, the eighth line, . . . The table 511c shown in FIG. 15C is selected when y(p)=3n, that is, when the position signal specifies the third line, the sixth line, the ninth line, . . .

Like the previously described first switch circuit 412, the first switch circuit 512 is of a change-over switch type and controlled by the control signal from the position signal decision circuit 42. When the position signal decision circuit decides that the position signal represents other positions than the overlapping zone, the first switch circuit applies the 8-shade image signal to either the first shift register 43 corresponding to the head unit 232 or a second shift register 44 corresponding to the head unit 233. On the other hand, when the position signal decision circuit decides that the position signal represents the overlapping zone, the first switch circuit is placed to the OFF position by the control signal.

Like the previously described second switch circuit 413, the second switch circuit 513 comprises two single-pole single-throw type ganged switches which are simultaneously turned ON or OFF by the control signal from the position signal decision circuit 42. When the position signal decision circuit decides that the position signal represents other positions than the overlapping zone, the second switch circuit is turned OFF. On the other hand, when the position signal decision circuit decides that the position signal represents the overlapping zone, the second switch circuit is turned ON by the control signal to thereby apply first and second outputs of the lookup table 511 to the first and second shift registers 43 and 44, respectively.

In such a configuration, suppose that an image signal at the shade level 7 is applied through 18 successive lines to a total of 18 ink nozzles including and centered at the six ink nozzles a through f in the overlapping zone of the head units 232 and 233. The 18 ink nozzles are described as the first through eighteenth ink nozzles.

First, on the first line, using the first through the sixth ink nozzle the head unit 232 alone makes printing. In this case, the first switch circuit 512 is operated by the control signal from the position signal decision circuit 42 to send an 8-shade image signal to the first shift register 43, while the second switch circuit 413 is turned OFF. At this time, therefore, the image signal passes through the correction circuit 51 as it is and then enters the first shift register 43.

For the seventh through the twelfth ink nozzle, the head units 232 and 233 overlap with each other in the paper feed direction y. In the overlapping zone, ink ejection from the head unit 232 and ink ejection from the head unit 233 are combined to form one dot; thus, the first switch circuits 412 and 413 are turned OFF and ON, respectively, by the control signal from the position signal decision circuit 42. In this case, the image signal is distributed between the head units 232 and 233 through the use of the lookup table 511. Which table to use for image signal distribution is determined by the paper feed direction position signal.

The table 511a is selected in printing the first line. In this case, when the image signal corresponds to the ink nozzles a, b and c of the head unit 232 and the ink nozzles f, e and d of the head unit 233, the first output for the ink nozzles a, b and c of the head unit 232 is applied to the first shift register 43 as an image signal at the shade level 6, while the second output for the ink nozzles f, e and d of the head unit 233 is applied to the second shift register 44 as an image signal at the shade level 1.

When the image signal corresponds to the ink nozzles d, e and f of the head unit 232 and the ink nozzles c, b and a of the head unit 233, the first output for the ink nozzles d, e and f of the head unit 232 is applied to the first shift register 43 as an image signal at the shade level 1, while the second output for the ink nozzles c, b and a of the head unit 233 is applied to the second shift register 44 as an image signal at the shade level 6.

For the thirteenth through the eighteenth ink nozzle, the head unit 233 makes printing by itself. In this case, the first switch circuit 512 is switched by the control signal from the position signal decision circuit 42 to send the 8-shade image signal to the second shift register 44, while the second switch circuit 413 is turned OFF. At this time, therefore, the image signal passes through the correction circuit 41 as it is and then enters the second shift register 44.

When the image signal for the first line has been fed into the first and second shift registers 43 and 44 in this manner, the first and second driver circuits 45 and 46 drive the head units 232 and 233, respectively, thereby allowing ink to be ejected from each ink nozzle. Of course, since the head units 232 and 233 are offset with respect to each other in the y direction, the timing of ink ejection is adjusted so that printing is made as a line.

For the first through the sixth ink nozzle, the head unit 232 makes printing by itself. Thus, the processing for the second line and later remains unchanged from that for the first line. For the thirteenth through the eighteenth ink nozzle, on the other hand, the head unit 233 makes printing by itself. Thus, in this case as well, the processing for the second line and later remains unchanged from that for the first line.

However, for the seventh through the twelfth ink nozzle, the processing varies with each line because the lookup table 511 is used.

In printing the second line, the table 511b is selected. In this case, the first output for the ink nozzles a, b and c of the head unit 232 is applied to the first shift register 43 as an image signal at the shade level 5, while the second output for the ink nozzles f, e and d of the head unit 233 is applied to the second shift register 44 as an image signal at the shade level 2.

In addition, the first output for the ink nozzles d, e and f of the head unit 232 is applied to the first shift register 43 as an image signal at the shade level 2, while the second output for the ink nozzles c, b and a of the head unit 233 is applied to the second shift register 44 as an image signal at the shade level 5.

In printing the third line, the table 511c is selected. In this case, the first output for the ink nozzles a, b and c of the head unit 232 is applied to the first shift register 43 as an image signal at the shade level 4, while the second output for the ink nozzles f, e and d of the head unit 233 is applied to the second shift register 44 as an image signal at the shade level 3.

In addition, the first output for the ink nozzles d, e and f of the head unit 232 is applied to the first shift register 43 as an image signal, at the shade level 3, while the second output for the ink nozzles c, b and a of the head unit 233 is applied to the second shift register 44 as an image signal at the shade level 4.

Thus, in printing the (3n-2)nd line, the shade distribution between the head units 232 and 233 is performed according to data in the table 511a for the seventh through the twelfth ink nozzle. In printing the (3n-1)st line, the shade distribution between the head units 232 and 233 is performed according to data in the table 511b. In printing the 3n-th line, the shade distribution between the head units 232 and 233 is performed according to data in the table 511c. Note that n=1, 2, 3, . . . .

Figures 16A, 16B:
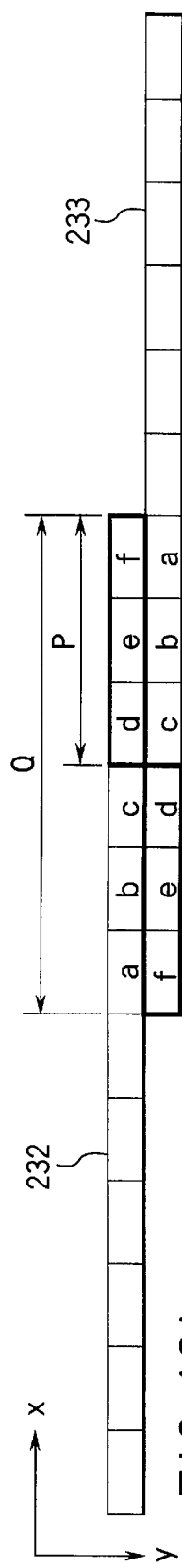
FIGS. 16A and 16B show the arrangement of ink nozzles of the overlapping head units and shade levels printed by the respective ink nozzles after correction in the second embodiment.

FIG. 16 shows the distribution of shades between the head units 232 and 233 for the first through the eighteenth ink nozzle on the first through the eighteenth line. For the first through the sixth ink nozzle, the shade distribution between the head units 232 and 233 is (7, 0) for all the 18 lines, indicating that the head unit 232 makes printing by itself.

For the seventh through the ninth ink nozzle, the shade distribution is (6, 1) on the (3n-2)nd line, indicating that one dot is formed by a combination of printing at the shade level 6 by the head unit 232 and printing at the shade level 1 by the head unit 233. On the (3n-1)st line, the distribution is (5, 2), indicating that one dot is formed by a combination of printing at the shade level 5 by the head unit 232 and printing at the shade level 2 by the head unit 233. On the 3n-th line, the distribution is (4, 3), indicating that one dot is formed by a combination of printing at the shade level 4 by the head unit 232 and printing at the shade level 3 by the head unit 233.

For the tenth through the twelfth ink nozzle, the shade distribution is (1, 6) on the (3n-2)nd line, indicating that one dot is formed by a combination of printing at the shade level 1 by the head unit 232 and printing at the shade level 6 by the head unit 233. On the (3n-1)st line, the distribution is (2, 5), indicating that one dot is formed by a combination of printing at the shade level 2 by the head unit 232 and printing at the shade level 5 by the head unit 233. On the 3n-th line, the distribution is (3, 4), indicating that one dot is formed by a combination of printing at the shade level 3 by the head unit 232 and printing at the shade level 4 by the head unit 233.

Such printing control allows the change in printing density in the overlapping zone of the head units 232 and 233 to be made smaller in the line direction x than in the conventional technique as with the first embodiment. Moreover, in the paper feed direction y as well, a delicate change in density can be produced. Thus, irregularities in density in the form of line that extend in the paper feed direction becomes difficult to be recognized by human eyes, improving the recording quality.

Although the reduction of irregularities in density in the overlapping zone of the head units 232 and 233 was described here, it goes without saying that exactly the same image signal processing can be applied to the overlapping zone of the head units 231 and 232 to reduce irregularities in density. Further, although the second embodiment was described as the lookup table comprising three tables selectively used for the (3n-2)nd line, the (3n-1)st line, and the 3n-th line, this is not restrictive. The values in these tables are not restrictive, either.

Third Embodiment

This embodiment will be described in terms of printing control at 16 shade levels. In this embodiment as well, the overall configuration of the ink jet recording apparatus remains unchanged from that shown in FIG. 1.

In this ink jet recording apparatus, the time interval during which the volume of ejected ink is proportional to the power application time is divided into 15 equal time periods to obtain the smallest period of time as a unit and then the power application time is varied in units of the smallest period of time. This provides printing control at shade levels of 1 to 15. The inclusion of shade level 0 with no ink ejection allows printing control at 16 shade levels. The pseudo-halftoning of an input image signal can provide an image signal adapted for printing control at 16 shade levels from 0 to 15.

In FIG. 17, the overlapping zone of the head units 232 and 233 is shown enlarged. The head units 232 and 233 overlap with each other by eight ink nozzles. Of eight ink nozzles a, b, c, d, e, f, g, and h at one end of the head unit 232 (corresponding to the Q number of ink nozzles), four endmost nozzles e, f, g, and h correspond to the P number of ink nozzles that may produce a change in density. Likewise, of eight ink nozzles h, g, f, e, d, c, b, and a at one end of the head unit 233 (corresponding to the Q number of endmost ink nozzles), four endmost nozzles h, g, f, and e correspond to the P number of ink nozzles that may produce a change in density.

The embodiment makes a decision of whether an input 16-shade image signal corresponds to the ink nozzles a through h in the overlapping zone of the head units 232 and 233 and, if so, distributes that input image signal to the head units 232 and 233 so that each of the ink nozzles a through h of the head unit 232 and the corresponding one of the ink nozzles h through a of the head unit 233 eject ink to form one dot. Each of the ink nozzles other than the overlapping ink nozzles is individually controlled by the image signal as hitherto.

Figure 18:
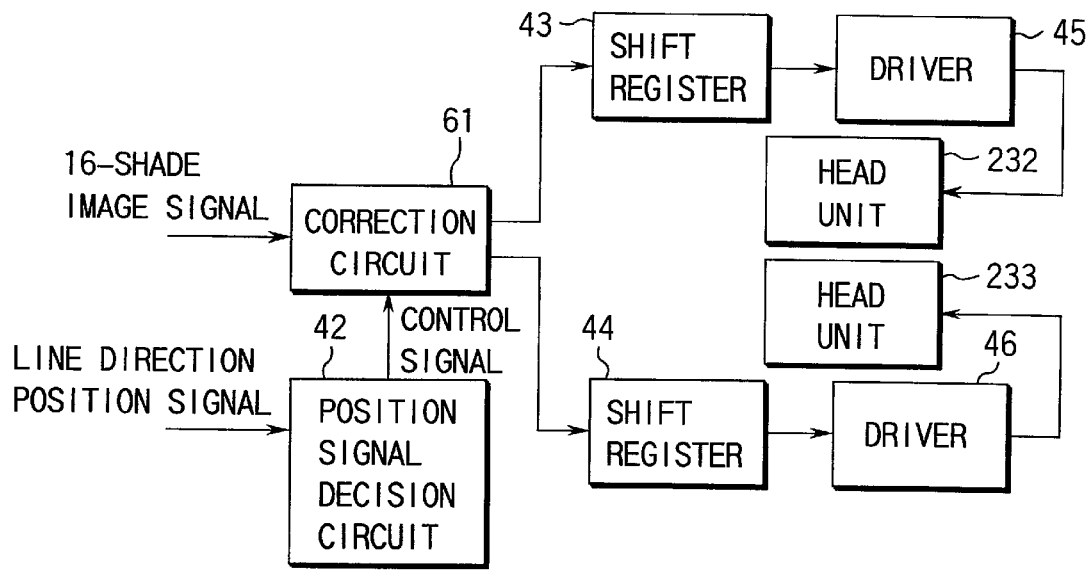
FIG. 18 shows essential circuit components in the third embodiment.

FIG. 18 is a block diagram of a control circuit that implements such control. A 16-shade image signal is applied to a correction circuit 61 and a line direction (x) position signal is applied to the position signal decision circuit 42. The position signal decision circuit makes a decision of whether the input position signal represents the overlapping zone of the head units 232 and 233 and applies a control signal to the correction circuit 61.

Figure 19:
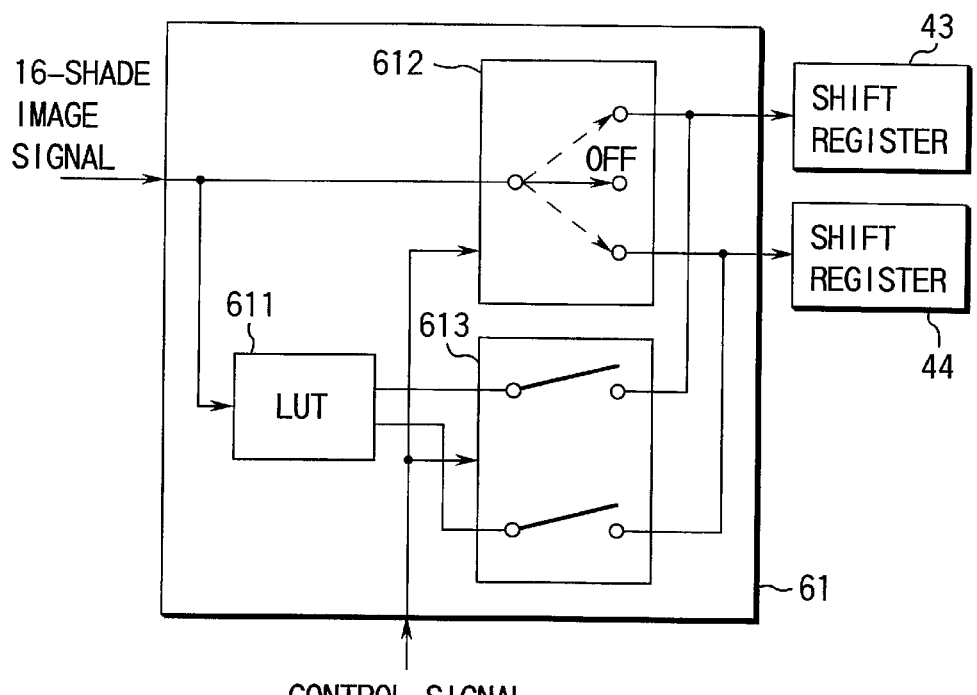
FIG. 19 shows the arrangement of the correction circuit of FIG. 18.

The correction circuit 61 is composed, as shown in FIG. 19, of a lookup table (LUT) 611, a first switch circuit 612 that is used when no shading control is performed, and a second switch circuit 613 that is used when shading control is performed. As shown in FIG. 20, the lookup table 611 stores information representing how an input shade in the range from 0 to 15 is converted to an output shade for each of the overlapping ink nozzles a, b, c, d, e, f, g, and h of the head units 232 and 233. The output shade level is determined from the amounts of ejected ink of the respective ink nozzles a through h including the four ending ink nozzles e, f, g, and h of each of the head units 232 and 233 that may produce a change in printing density, which are found in advance.

The first switch circuit 612 is of a change-over switch type and controlled by the control signal from the position signal decision circuit 42. When the position signal decision circuit decides that the position signal represents other positions than the overlapping zone, the first switch circuit applies the 16-shade image signal to either the first shift register 43 corresponding to the head unit 232 or the second shift register 44 corresponding to the head unit 233. On the other hand, when the position signal decision circuit decides that the position signal represents the overlapping zone, the first switch circuit is placed to the OFF position by the control signal.

The second switch circuit 613 comprises two single-pole single-throw type ganged switches which are simultaneously turned ON or OFF by the control signal from the position signal decision circuit 42. When the position signal decision circuit decides that the position signal represents other positions than the overlapping zone, the second switch circuit is turned OFF. On the other hand, when the position signal decision circuit decides that the position signal represents the overlapping zone, the second switch circuit is turned ON by the control signal to thereby apply first and second outputs of the lookup table 611 to the first and second shift registers 43 and 44, respectively.

The output of the first shift register 43 is applied to the first driver circuit 45, which, in turn, drives the head unit 232. The output of the second shift register 44 is applied to the second driver circuit 46, which, in turn, drives the head unit 232.

In such a configuration, suppose that an image signal at the shade level 15 is applied through 20 successive lines to a total of 20 ink nozzles including and centered at the eight ink nozzles a through h in the overlapping zone of the head units 232 and 233. The 20 ink nozzles are described as the first through twentieth ink nozzles.

First, on the first line, using the first through the sixth ink nozzle the head unit 232 alone makes printing. In this case, the first switch circuit 612 is operated by the control signal from the position signal decision circuit 42 to send a 16-shade image signal to the first shift register 43, while the second switch circuit 613 is turned OFF. At this time, therefore, the input image signal passes through the correction circuit 61 as it is and then enters the first shift register 43.

For the seventh through the fourteenth ink nozzle, the head units 232 and 233 overlap with each other in the paper feed direction y. In the overlapping zone, ink ejection from the head unit 232 and ink ejection from the head unit 233 are combined to form one dot; thus, the first switch circuits 612 and 613 are turned OFF and ON, respectively, by the control signal from the position signal decision circuit 42. In this case, the image signal is distributed between the head units 232 and 233 through the use of the lookup table 611.

That is, when the 16-shade image signal corresponds to the ink nozzle a of the head unit 232 and the ink nozzle h of the head unit 233, the first output for the ink nozzle a is applied to the first shift register 43 as an image signal at the shade level 14, while the second output for the ink nozzle h is applied to the second shift register 44 as an image signal at the shade level 1.

Likewise, when the 16-shade image signal corresponds to the ink nozzle b of the head unit 232 and the ink nozzle g of the head unit 233, the first output for the ink nozzle b is applied to the first shift register 43 as an image signal at the shade level 12, while the second output for the ink nozzle g is applied to the second shift register 44 as an image signal at the shade level 2.

Likewise, when the 16-shade image signal corresponds to the ink nozzle c of the head unit 232 and the ink nozzle f of the head unit 233, the first output is applied to the first shift register 43 as an image signal at the shade level 14, while the second output is applied to the second shift register 44 as an image signal at the shade level 1. Likewise, when the 16-shade image signal corresponds to the ink nozzle d of the head unit 232 and the ink nozzle e of the head unit 233, the first output is applied to the first shift register 43 as an image signal at the shade level 12, while the second output is applied to the second shift register 44 as an image signal at the shade level 2.

Likewise, when the 16-shade image signal corresponds to the ink nozzle e of the head unit 232 and the ink nozzle d of the head unit 233, the first output is applied to the first shift register 43 as an image signal at the shade level 2, while the second output is applied to the second shift register 44 as an image signal at the shade level 12. Likewise, when the 16-shade image signal corresponds to the ink nozzle f of the head unit 232 and the ink nozzle c of the head unit 233, the first output is applied to the first shift register 43 as an image signal at the shade level 1, while the second output is applied to the second shift register 44 as an image signal at the shade level 14.

Likewise, when the 16-shade image signal corresponds to the ink nozzle g of the head unit 232 and the ink nozzle b of the head unit 233, the first output is applied to the first shift register 43 as an image signal at the shade level 2, while the second output is applied to the second shift register 44 as an image signal at the shade level 12. Likewise, when the 16-shade image signal corresponds to the ink nozzle h of the head unit 232 and the ink nozzle a of the head unit 233, the first output is applied to the first shift register 43 as an image signal at the shade level 1, while the second output is applied to the second shift register 44 as an image signal at the shade level 14.

For the fifteenth through the twentieth ink nozzle, the head unit 233 makes printing by itself. In this case, the first switch circuit 612 is switched by the control signal from the position signal decision circuit 42 to send the 16-shade image signal to the second shift register 44, while the second switch circuit 613 is turned OFF. At this time, therefore, the input image signal passes through the correction circuit 41 as it is and then enters the second shift register 44.

When the image signal for the first line has been fed into the first and second shift registers 43 and 44 in this manner, the first and second driver circuits 45 and 46 drive the head units 232 and 233, respectively, thereby allowing ink to be ejected from each ink nozzle. Of course, since the head units 232 and 233 are offset with respect to each other in the y direction, the timing of ink ejection is adjusted so that printing is made as a line. Upon termination of printing the first line, the same processing is performed for the second line and then repeated until the twentieth line.

Figures 22A, 22B:
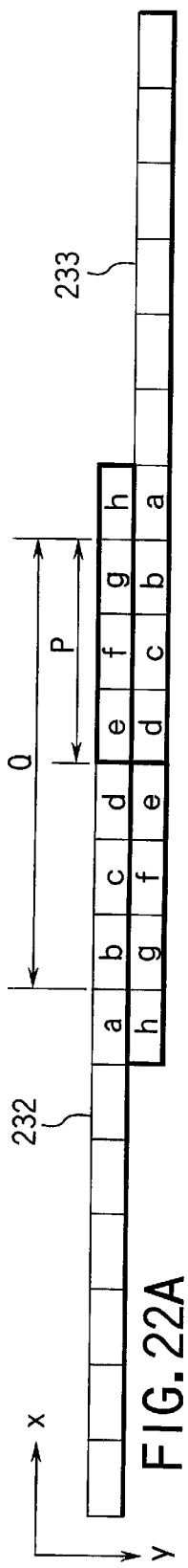
FIGS. 22A and 22B show the arrangement of ink nozzles of the overlapping head units and shade levels printed by the respective ink nozzles after correction in the third embodiment.

FIG. 22 shows the distribution of shades between the head units 232 and 233 for the first through the twentieth ink nozzle on the first through the twentieth line. For the first through the sixth ink nozzle, the shade distribution between the head units 232 and 233 is (15, 0) for all of the 18 lines, indicating that the head unit 232 makes printing at the shade level 15 by itself.

For the seventh ink nozzle, the shade distribution is (14, 1) for all of the 20 lines, indicating that one dot is formed by a combination of printing at the shade level 14 by the head unit 232 and printing at the shade level 1 by the head unit 233. For the eighth ink nozzle, the shade distribution is (12, 2) for all of the 20 lines, indicating that one dot is formed by a combination of printing at the shade level 12 by the head unit 232 and printing at the shade level 2 by the head unit 233. For the ninth ink nozzle, the shade distribution is (14, 1) for all of the 20 lines, indicating that one dot is formed by a combination of printing at the shade level 14 by the head unit 232 and printing at the shade level 1 by the head unit 233. For the tenth ink nozzle, the shade distribution is (12, 2) for all of the 20 lines, indicating that one dot is formed by a combination of printing at the shade level 12 by the head unit 232 and printing at the shade level 2 by the head unit 233.

In addition, for the eleventh ink nozzle, the shade distribution is (2, 12) for all of the 20 lines, indicating that one dot is formed by a combination of printing at the shade level 2 by the head unit 232 and printing at the shade level 12 by the head unit 233. For the twelfth ink nozzle, the shade distribution is (1, 14) for all of the 20 lines, indicating that one dot is formed by a combination of printing at the shade level 1 by the head unit 232 and printing at the shade level 14 by the head unit 233. For the thirteenth ink nozzle, the shade distribution is (2, 12) for all of the 20 lines, indicating that one dot is formed by a combination of printing at the shade level 2 by the head unit 232 and printing at the shade level 12 by the head unit 233. For the fourteenth ink nozzle, the shade distribution is (1, 14) for all of the 20 lines, indicating that one dot is formed by a combination of printing at the shade level 1 by the head unit 232 and printing at the shade level 14 by the head unit 233.

Moreover, for the fifteenth through the twentieth ink nozzle, the shade distribution is (0, 15) for all of the 20 lines, indicating that the head unit 233 makes printing at the shade level 15 by itself.

Such printing control allows the printing density in the overlapping zone of the head units 232 and 233 to change in such a way, as shown in FIG. 21, as to increase from d0 to d2, then decrease to d2' to cancel out the increase, increase again to d2, and then decrease to d2'. That is, an increase and a decrease in printing density alternate so that the average density becomes constant.

Figure 30:
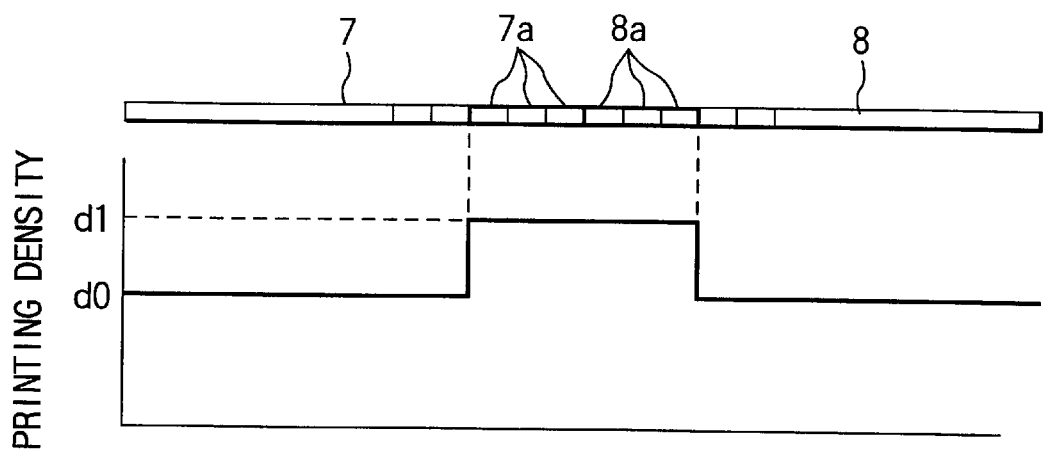
FIG. 30 is a diagram for use in explanation of problems associated with a conventional technique.

In addition, the maximum variation from d0 to d2 becomes smaller than the variation from d0 to d1 in the conventional technique shown in FIG. 30. That is, the endmost ink nozzle h of each of the head units 232 and 233, which is most greatly affected by the change of the volume of ejected ink, is set to the shade level 1 which involves the smallest amount of ink, while the ink nozzle a of the other head unit, which has little variation in the volume of ejected ink and is combined with that endmost ink nozzle h to form one dot, is set to the shade level 14. This results in the shade level 15. Thus, the incremental change d2 can be minimized. Further, in order to keep the average density constant, it is required to decrease the amount of ejected ink so that the increment d2 is canceled out. To this end, the shade level of one dot formed by the corresponding ink nozzles b and g of the head units 232 and 233 is reduced by one level to shade level 14. Such shade distribution between ink nozzles as allows the increment d2 and the decrement d2' to become equal to each other is determined in advance.

Likewise, the ink nozzle f of each of the head units 232 and 233 is set to the shade level 1, while the ink nozzle c of the other head unit, which is combined with that ink nozzle f to form one dot, is set to the shade level 14. This results in the shade level 15. Thus, the resulting incremental change d2 can also be minimized. Further, in order to cancel out the increment d2 so that the average density is kept constant, the shade level of one dot formed by the corresponding ink nozzles d and e of the head units 232 and 233 is reduced by one level to shade level 14. In this case as well, in order to allow the increment d2 and the decrement d2' to become equal to each other, shade distribution between ink nozzles is determined in advance.

Thus, in the overlapping zone of the head units 232 and 233, an increase in the printing density of one dot formed by the ink nozzles a and h of the head units is minimized, and the density of one dot formed by the ink nozzles b and g of the head units is reduced to cancel out the incremental change in density; thus, the average density can be kept constant. Likewise, the amount of ejected ink from the ink nozzles c and f of the head units 232 and 233 increases, while the amount of ejected ink from the ink nozzles d and e of the head units 232 and 233 decreases, allowing the average density to be kept constant.

Thus, since the average density in the overlapping zone of the head units 232 and 233 and the average density in the non-overlapping zone can be made substantially equal to each other, the irregularities in density can be reduced and the recording quality can be improved.

Although the reduction of irregularities in density in the overlapping zone of the head units 232 and 233 was described here, it goes without saying that exactly the same image signal processing can be applied to the overlapping zone of the head units 231 and 232 to reduce irregularities in density.

Fourth Embodiment

This embodiment will be described in terms of printing control at 16 shade levels. In this embodiment as well, the overall configuration of the ink jet recording apparatus remains unchanged from that shown in FIG. 1.

In this ink jet recording apparatus, the time interval during which the volume of ejected ink is proportional to the power application time is divided into 15 equal time periods to obtain the smallest period of time as a unit and then the power application time is varied in units of the smallest period of time. This provides printing control at shade levels of 1 to 15. The inclusion of shade level 0 with no ink ejection allows printing control at 16 shade levels. The pseudo-halftoning of an input image signal can provide an image signal adapted for printing control at 16 shade levels from 0 to 15.

In FIG. 23, the overlapping zone of the head units 232 and 233 is shown enlarged. The head units 232 and 233 overlap with each other by twelve ending ink nozzles. The twelve ink nozzles A, B, C, D, E, F, G, H, I, J, K, and L at one end of the head unit 232 correspond to the Q number of ink nozzles, and the twelve ink nozzles l, k, j, h, g, f, e, d, c, b, and a at one end of the head unit 233 correspond to the Q number of ink nozzles.

Here, four ink nozzles corresponding to the P number of nozzles that may produce a change in density differ between contiguous printing and non-contiguous printing; in the case of contiguous printing, the four ending ink nozzles of the head units and, in the case of non-contiguous printing, the first four ink nozzles of ink nozzles that make printing. For example, when the endmost ink nozzle 1 of the head unit 233 is set to the shade level 0, that is, makes no printing, the four ink nozzles that may produce a change in density are k, j, i, and h. On the other hand, when the ink nozzle 1 makes printing, the four ink nozzles that may produce a change in density are l, k, j, and i.

The embodiment makes a decision of whether an input 16-shade image signal corresponds to the ink nozzles in the overlapping zone of the head units 232 and 233 and, if so, distributes that input image signal to the head units 232 and 233 so that each of the ink nozzles A through L of the head unit 232 and the corresponding one of the ink nozzles 1 through a of the head unit 233 eject ink to form one dot. Each of the ink nozzles other than the overlapping ink nozzles is individually controlled by the image signal as hitherto.

Figure 24:
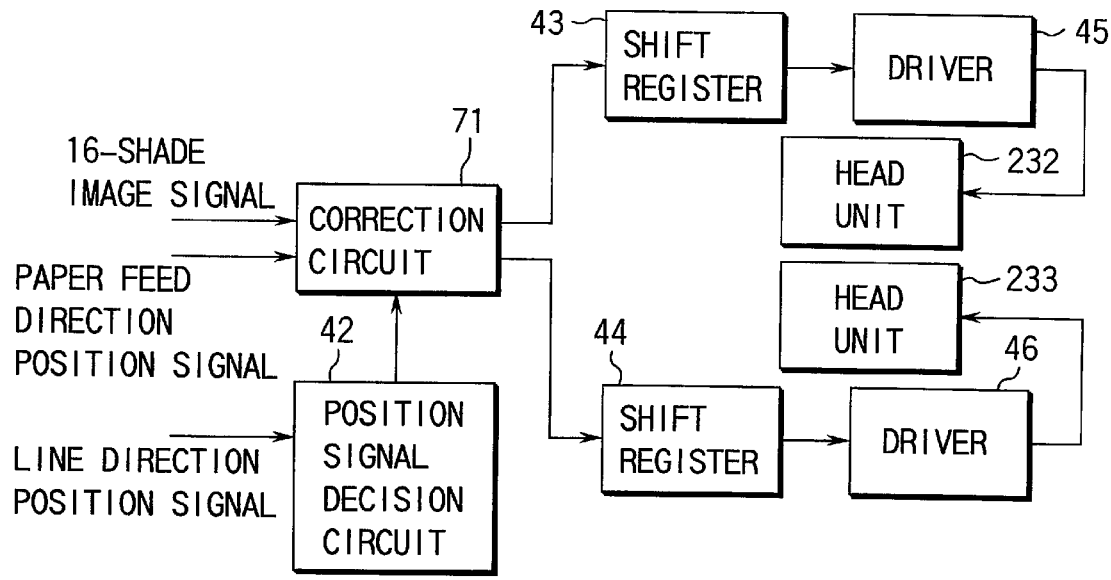
FIG. 24 shows essential circuit components in the fourth embodiment.

FIG. 24 is a block diagram of a control circuit that implements such control. A 16-shade image signal is applied to a correction circuit 71 and a line direction (x) position signal is applied to the position signal decision circuit 42. The position signal decision circuit makes a decision of whether the input position signal represents the overlapping zone of the head units 232 and 233 and applies a control signal to the correction circuit 71.

Figure 25:
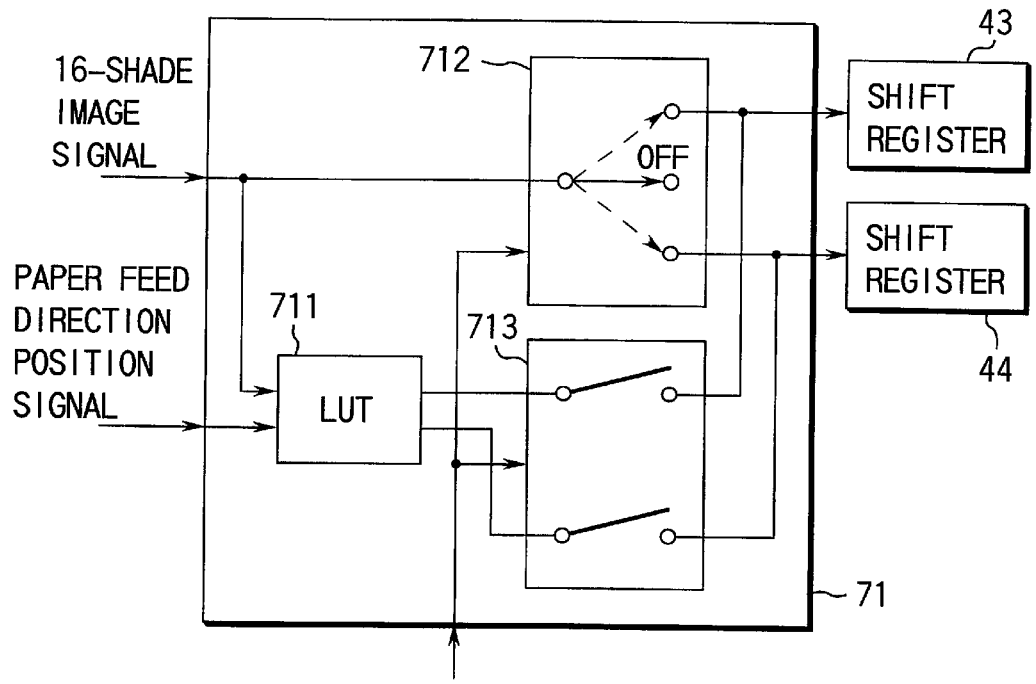
FIG. 25 shows the arrangement of the correction circuit of FIG. 24.

The correction circuit 71 is composed, as shown in FIG. 25, of a lookup table (LUT) 711, a first switch circuit 712 that is used when no shading control is performed, and a second switch circuit 713 that is used when shading control is performed. As shown in FIGS. 26A to 26C, the lookup table 711 comprises three tables 711a, 711b, and 711c which store information representing how an input shade in the range from 0 to 15 is converted to an output shade for each of the overlapping ink nozzles of the head units 232 and 233.

The table 711a shown in FIG. 26A is selected when the position in the paper feed direction y that the input paper feed direction position signal specifies is the (3n−2)nd line (n=1, 2, 3, . . . ) that is, when the position signal specifies the first line, the fourth line, the seventh line, . . . The table 711b shown in FIG. 26B is selected when the position in the paper feed direction y that the input paper feed direction position signal specifies is the (3n−1)st line, that is, when the position signal specifies the second line, the fifth line, the eighth line, . . . The table 711c shown in FIG. 26C is selected when the position in the paper feed direction y that the input paper feed direction position signal specifies is 3n-th line, that is, when the position signal specifies the third line, the sixth line, the ninth line, . . . .

The first switch circuit 712 is of a change-over switch type and controlled by the control signal from the position signal decision circuit 42. When the position signal decision circuit 42 decides that the position signal represents other positions than the overlapping zone, the first switch circuit applies the 16-shade image signal to either the first shift register 43 corresponding to the head unit 232 or the second shift register 44 corresponding to the head unit 233. On the other hand, when the position signal decision circuit decides that the position signal represents the overlapping zone, the first switch circuit is placed to the OFF position by the control signal.

The second switch circuit 713 comprises two single-pole single-throw type ganged switches which are simultaneously turned ON or OFF by the control signal from the position signal decision circuit 42. When the position signal decision circuit 42 decides that the position signal represents other positions than the overlapping zone, the second switch circuit is turned OFF. On the other hand, when the position signal decision circuit 42 decides that the position signal represents the overlapping zone, the second switch circuit is turned ON by the control signal to thereby apply first and second outputs of the lookup table 711 to the first and second shift registers 43 and 44, respectively.

The output of the first shift register 43 is applied to the first driver circuit 45, which, in turn, drives the head unit 232. The output of the second shift register 44 is applied to the second driver circuit 46, which, in turn, drives the head unit 232.

In such a configuration, suppose that an image signal at the shade level 15 is applied through 20 successive lines to a total of 20 ink nozzles including and centered at the twelve ink nozzles in the over-lapping zone of the head units 232 and 233. The 20 ink nozzles are described as the first through twentieth ink nozzles.

First, on the first line, using the first through the fourth ink nozzle the head unit 232 alone makes printing. In this case, the first switch circuit 712 is operated by the control signal from the position signal decision circuit 42 to send a 16-shade image signal to the first shift register 43, while the second switch circuit 713 is turned OFF. At this time, therefore, the input image signal passes through the correction circuit 71 as it is and then enters the first shift register 43.

With respect to the fifth through the sixteenth ink nozzle, the head units 232 and 233 overlap with each other in the paper feed direction y. In the overlapping zone, ink ejection from the head unit 232 and ink ejection from the head unit 233 are combined to form one dot; thus, the first switch circuits 712 and 713 are turned OFF and ON, respectively, by the control signal from the position signal decision circuit 42. In this case, the image signal is distributed between the head units 232 and 233 through the use of the lookup table 711. Which of the tables 711a, 711b and 711c to use for distribution is determined by the paper feed direction position signal.

For the first line, the table 711a is selected. In this case, when the 16-shade image signal corresponds to the ink nozzles A through D of the head unit 232 and the ink nozzles 1 through i of the head unit 233, the first output for the ink nozzles A through D is applied to the first shift register 43 as an image signal at the shade level 15, while the second output for the ink nozzles 1 through i is applied to the second shift register 44 as an image signal at the shade level 0.

Next, when the 16-shade image signal corresponds to the ink nozzle E of the head unit 232 and the ink nozzle h of the head unit 233, the first output for the ink nozzle E is applied to the first shift register 43 as an image signal at the shade level 14, while the second output for the ink nozzle h is applied to the second shift register 44 as an image signal at the shade level 1. Likewise, when the 16-shade image signal corresponds to the ink nozzle F of the head unit 232 and the ink nozzle g of the head unit 233, the first output for the ink nozzle F is applied to the first shift register 43 as an image signal at the shade level 12, while the second output for the ink nozzle g is applied to the second shift register 44 as an image signal at the shade level 2.

Likewise, when the 16-shade image signal corresponds to the ink nozzle G of the head unit 232 and the ink nozzle f of the head unit 233, the first output for the ink nozzle G is applied to the first shift register 43 as an image signal at the shade level 14, while the second output for the ink nozzle f is applied to the second shift register 44 as an image signal at the shade level 1. Likewise, when the 16-shade image signal corresponds to the ink nozzle H of the head unit 232 and the ink nozzle e of the head unit 233, the first output for the ink nozzle H is applied to the first shift register 43 as an image signal at the shade level 12, while the second output for the ink nozzle e is applied to the second shift register 44 as an image signal at the shade level 2.

Likewise, when the 16-shade image signal corresponds to the ink nozzle I of the head unit 232 and the ink nozzle d of the head unit 233, the first output for the ink nozzle I is applied to the first shift register 43 as an image signal at the shade level 2, while the second output for the ink nozzle d is applied to the second shift register 44 as an image signal at the shade level 12. Likewise, when the 16-shade image signal corresponds to the ink nozzle J of the head unit 232 and the ink nozzle c of the head unit 233, the first output for the ink nozzle J is applied to the first shift register 43 as an image signal at the shade level 1, while the second output for the ink nozzle c is applied to the second shift register 44 as an image signal at the shade level 14.

Likewise, when the 16-shade image signal corresponds to the ink nozzle K of the head unit 232 and the ink nozzle b of the head unit 233, the first output for the ink nozzle K is applied to the first shift register 43 as an image signal at the shade level 2, while the second output for the ink nozzle b is applied to the second shift register 44 as an image signal at the shade level 12. Likewise, when the 16-shade image signal corresponds to the ink nozzle L of the head unit 232 and the ink nozzle a of the head unit 233, the first output for the ink nozzle L is applied to the first shift register 43 as an image signal at the shade level 1, while the second output for the ink nozzle a is applied to the second shift register 44 as an image signal at the shade level 14.

For the seventeenth through the twentieth ink nozzle, the head unit 233 makes printing by itself. In this case, the first switch circuit 712 is switched by the control signal from the position signal decision circuit 42 to send the 16-shade image signal to the second shift register 44, while the second switch circuit 713 is turned OFF. At this time, therefore, the input image signal passes through the correction circuit 71 as it is and then enters the second shift register 44.

When the image signal for the first line has been fed into the first and second shift registers 43 and 44 in this manner, the first and second driver circuits 45 and 46 drive the head units 232 and 233, respectively, thereby allowing ink to be ejected from each ink nozzle. Of course, since the head units 232 and 233 are offset with respect to each other in the y direction, the timing of ink ejection is adjusted so that printing is made as a line. Upon termination of printing of the first line, printing of the second line is commenced.

To print the second line, the table 711b is selected. In this case, when the 16-shade image signal corresponds to the ink nozzles A and B of the head unit 232 and the ink nozzles l and k of the head unit 233, the first output for the ink nozzles A and B is applied to the first shift register 43 as an image signal at the shade level 15, while the second output for the ink nozzles l and k is applied to the second shift register 44 as an image signal at the shade level 0. Likewise, when the 16-shade image signal corresponds to the ink nozzle C of the head unit 232 and the ink nozzle j of the head unit 233, the first output for the ink nozzle C is applied to the first shift register 43 as an image signal at the shade level 14, while the second output for the ink nozzle j is applied to the second shift register 44 as an image signal at the shade level 2.

Likewise, when the 16-shade image signal corresponds to the ink nozzle D of the head unit 232 and the ink nozzle i of the head unit 233, the first output for the ink nozzle D is applied to the first shift register 43 as an image signal at the shade level 12, while the second output for the ink nozzle i is applied to the second shift register 44 as an image signal at the shade level 2.

Likewise, when the 16-shade image signal corresponds to the ink nozzle E of the head unit 232 and the ink nozzle h of the head unit 233, the first output for the ink nozzle E is applied to the first shift register 43 as an image signal at the shade level 14, while the second output for the ink nozzle h is applied to the second shift register 44 as an image signal at the shade level 1. Likewise, when the 16-shade image signal corresponds to the ink nozzle F of the head unit 232 and the ink nozzle g of the head unit 233, the first output for the ink nozzle g is applied to the first shift register 43 as an image signal at the shade level 12, while the second output for the ink nozzle g is applied to the second shift register 44 as an image signal at the shade level 2.

Likewise, when the 16-shade image signal corresponds to the ink nozzle G of the head unit 232 and the ink nozzle f of the head unit 233, the first output for the ink nozzle G is applied to the first shift register 43 as an image signal at the shade level 2, while the second output for the ink nozzle f is applied to the second shift register 44 as an image signal at the shade level 12. Likewise, when the 16-shade image signal corresponds to the ink nozzle H of the head unit 232 and the ink nozzle e of the head unit 233, the first output for the ink nozzle H is applied to the first shift register 43 as an image signal at the shade level 1, while the second output for the ink nozzle e is applied to the second shift register 44 as an image signal at the shade level 14.

Likewise, when the 16-shade image signal corresponds to the ink nozzle I of the head unit 232 and the ink nozzle d of the head unit 233, the first output for the ink nozzle I is applied to the first shift register 43 as an image signal at the shade level 2, while the second output for the ink nozzle d is applied to the second shift register 44 as an image signal at the shade level 12. Likewise, when the 16-shade image signal corresponds to the ink nozzle J of the head unit 232 and the ink nozzle c of the head unit 233, the first output for the ink nozzle J is applied to the first shift register 43 as an image signal at the shade level 1, while the second output for the ink nozzle c is applied to the second shift register 44 as an image signal at,the shade level 14.

Likewise, when the 16-shade image signal corresponds to the ink nozzles K and L of the head unit 232 and the ink nozzles b and a of the head unit 233, the first output for the ink nozzles K and L is applied to the first shift register 43 as an image signal at the shade level 0, while the second output for the ink nozzles b and a is applied to the second shift register 44 as an image signal at the shade level 15.

For the seventeenth through the twentieth ink nozzle, the head unit 233 makes printing by itself. In this case, the first switch circuit 712 is switched by the control signal from the position signal decision circuit 42 to send the 16-shade image signal to the second shift register 44, while the second switch circuit 713 is turned OFF. At this time, therefore, the input image signal passes through the correction circuit 71 as it is and then enters the second shift register 44.

When the image signal for the first line has been fed into the first and second shift registers 43 and 44 in this manner, the first and second driver circuits 45 and 46 drive the head units 232 and 233, respectively, thereby allowing ink to be ejected from each ink nozzle. Upon termination of printing of the second line, printing of the third line is commenced.

To print the third line, the table 711c is selected. In this case, when the 16-shade image signal corresponds to the ink nozzle A of the head unit 232 and the ink nozzle 1 of the head unit 233, the first output for the ink nozzle A is applied to the first shift register 43 as an image signal at the shade level 14, while the second output for the ink nozzle 1 is applied to the second shift register 44 as an image signal at the shade level 1.

Likewise, when the 16-shade image signal corresponds to the ink nozzle B of the head unit 232 and the ink nozzle k of the head unit 233, the first output for the ink nozzle B is applied to the first shift register 43 as an image signal at the shade level 12, while the second output for the ink nozzle k is applied to the second shift register 44 as an image signal at the shade level 2. Likewise, when the 16-shade image signal corresponds to the ink nozzle C of the head unit 232 and the ink nozzle j of the head unit 233, the first output for the ink nozzle C is applied to the first shift register 43 as an image signal at the shade level 14, while the second output for the ink nozzle j is applied to the second shift register 44 as an image signal at the shade level 1.

Likewise, when the 16-shade image signal corresponds to the ink nozzle D of the head unit 232 and the ink nozzle i of the head unit 233, the first output for the ink nozzle D is applied to the first shift register 43 as an image signal at the shade level 12, while the second output for the ink nozzle i is applied to the second shift register 44 as an image signal at the shade level 2. Likewise, when the 16-shade image signal corresponds to the ink nozzle E of the head unit 232 and the ink nozzle h of the head unit 233, the first output for the ink nozzle E is applied to the first shift register 43 as an image signal at the shade level 2, while the second output for the ink nozzle h is applied to the second shift register 44 as an image signal at the shade level 12.

Likewise, when the 16-shade image signal corresponds to the ink nozzle F of the head unit 232 and the ink nozzle g of the head unit 233, the first output for the ink nozzle F is applied to the first shift register 43 as an image signal at the shade level 1, while the second output for the ink nozzle g is applied to the second shift register 44 as an image signal at the shade level 14. Likewise, when the 16-shade image signal corresponds to the ink nozzle G of the head unit 232 and the ink nozzle f of the head unit 233, the first output for the ink nozzle G is applied to the first shift register 43 as an image signal at the shade level 2, while the second output for the ink nozzle f is applied to the second shift register 44 as an image signal at the shade level 12.

Likewise, when the 16-shade image signal corresponds to the ink nozzle H of the head unit 232 and the ink nozzle e of the head unit 233, the first output for the ink nozzle H is applied to the first shift register 43 as an image signal at the shade level 1, while the second output for the ink nozzle e is applied to the second shift register 44 as an image signal at the shade level 14. Likewise, when the 16-shade image signal corresponds to the ink nozzles I through L of the head unit 232 and the ink nozzles d through a of the head unit 233, the first output for the ink nozzles I through L is applied to the first shift register 43 as an image signal at the shade level 0, while the second output for the ink nozzles d through a is applied to the second shift register 44 as an image signal at the shade level 15.

For the seventeenth through the twentieth ink nozzle, the head unit 233 alone makes printing. In this case, the first switch circuit 712 is switched by the control signal from the position signal decision circuit 42 to send the 16-shade image signal to the second shift register 44, while the second switch circuit 713 is turned OFF. At this time, therefore, the input image signal passes through the correction circuit 71 as it is and then enters the second shift register 44.

When the image signal for the third line has been fed into the first and second shift registers 43 and 44 in this manner, the head units 232 and 233 are driven by the first and second driver circuits 45 and 46, respectively, thereby allowing ink to be ejected from each ink nozzle. Upon termination of printing of the third line, printing of the fourth line is commenced. The processing for the fourth line remains unchanged from that for the first line.

Figures 28A, 28B:
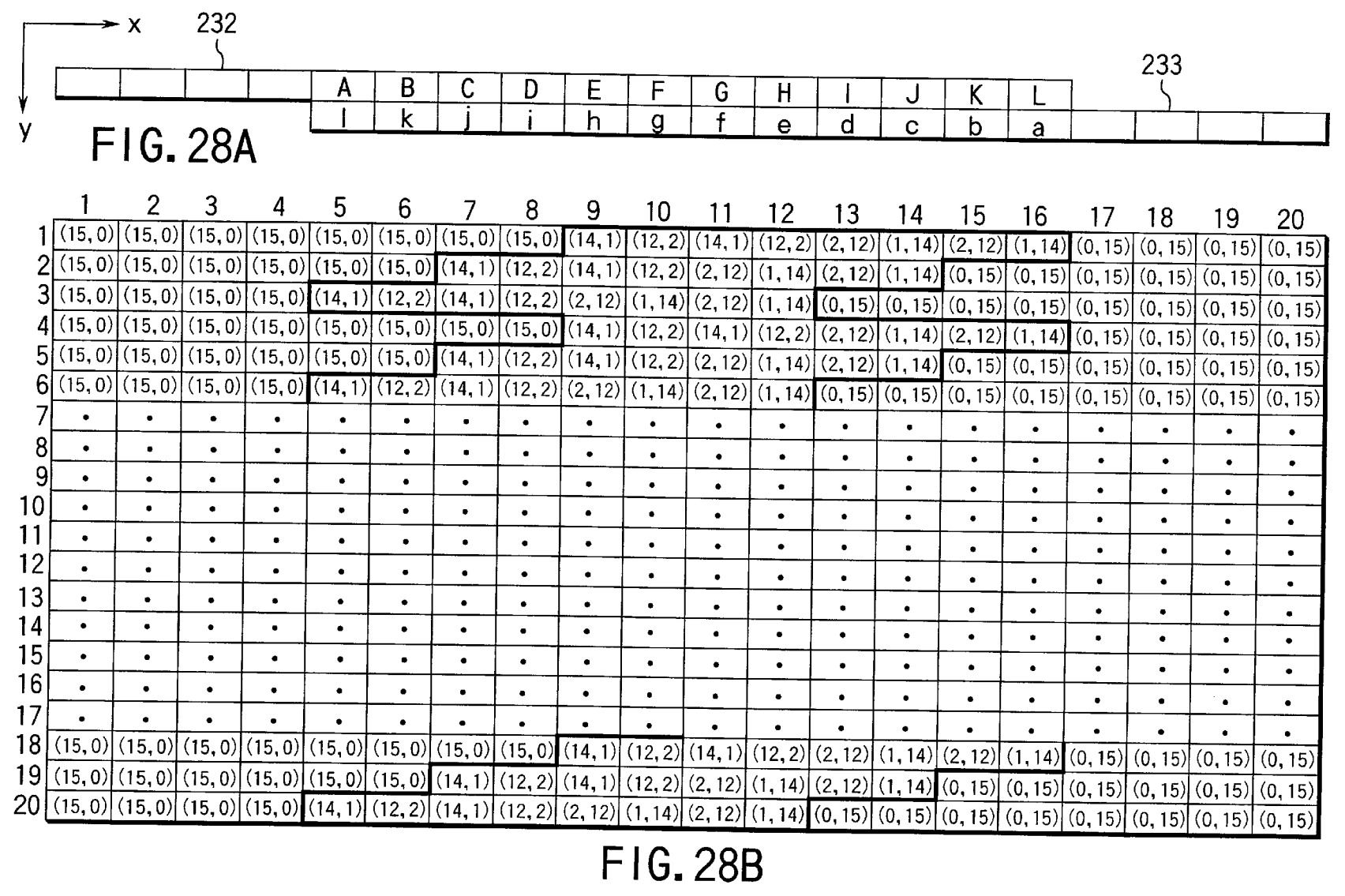

As described above, for the fifth through the sixteenth ink nozzle, the data in the table 711a are used for shade distribution in printing the (3n−2)nd line. The data in the table 711b are used for shade distribution in printing the (3n−1)st line. The data in the table 711a are used for shade distribution in printing the 3n-th line. The shades to be distributed between the head units by the tables 711a, 711b, and 711c are determined from the previously examined amounts of ejected ink of the respective ink nozzles. FIG. 28 shows the distribution of shades between the head units 232 and 233 with respect to the first through twentieth ink nozzles for the first through twentieth lines.

Figure 27A:
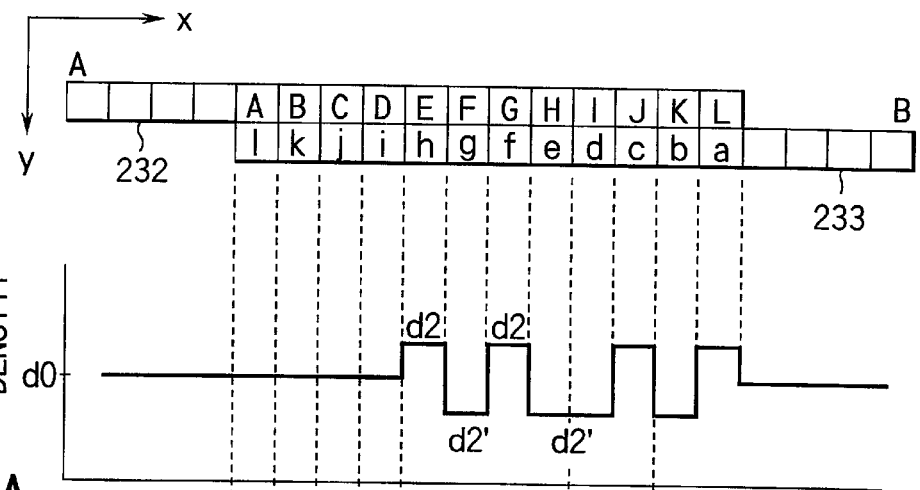
FIGS. 27A, 27B and 27C show variations in printing density in the ink nozzle overlapping zone of the head units.
Figure 27B:
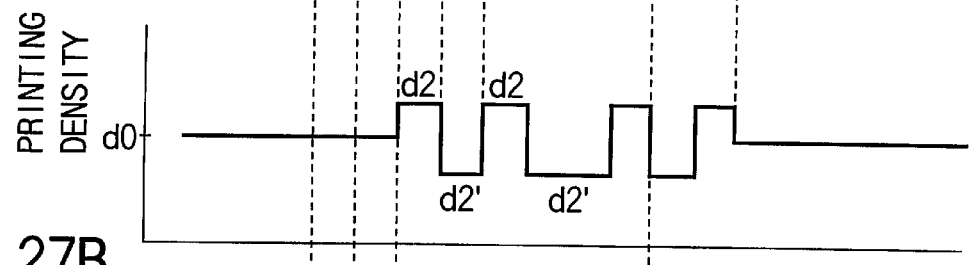
Figure 27C:
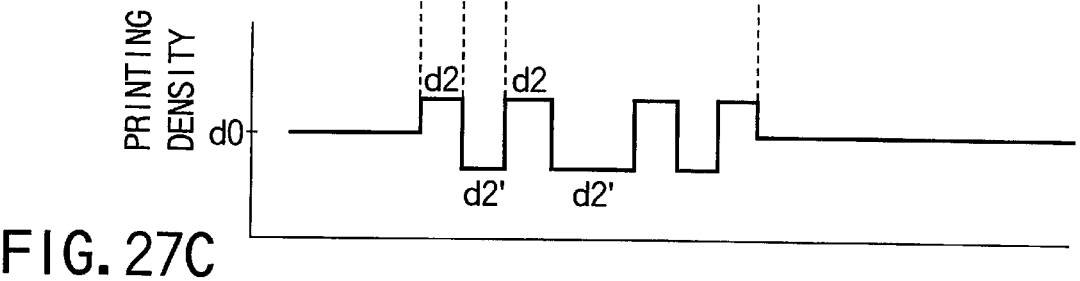
Figure 29:
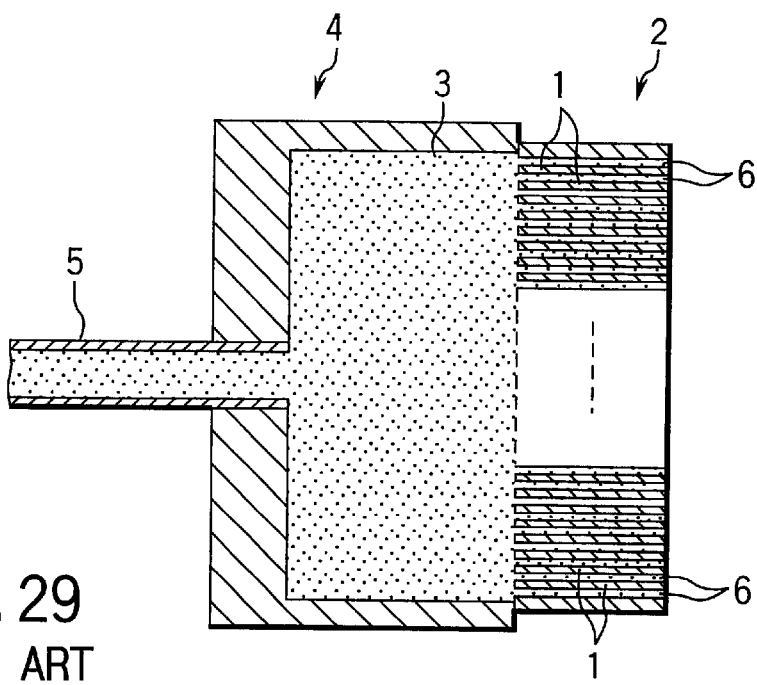
FIG. 29 is a cross-sectional view of an ink jet head unit.

Such printing control causes the printing density in the overlapping zone of the head units 232 and 233 to vary as shown in FIGS. 27A to 27C. That is, as in the third embodiment, the printing density varies with respect to the line direction x in such a way as to increase from d0 to d2, then decrease to d2' to cancel out the increase, increase again to d2, and then decrease to d2'. That is, an increase and a decrease in printing density alternate so that the average density becomes constant. In addition, the change from d0 to d2 is smaller than the change from d0 to d1 in the conventional technique shown in FIG. 30. FIG. 27A shows the change in printing density on the (3n−2)nd line, FIG. 27B shows the change in printing density on the (3n−1)st line, and FIG. 27C shows the change in printing density on the 3n-th line.

In addition, the point at which the printing density is increased or decreased is made to vary from line to line, i.e., in the paper feed direction y perpendicular to the line direction x; thus, irregularities in density in the form of line that extend in the paper feed direction become difficult to be recognized by human eyes. As a result, the recording quality can be further improved.

Although the reduction of irregularities in density in the overlapping zone of the head units 232 and 233 was described here, it goes without saying that exactly the same image signal processing can be applied to the overlapping zone of the head units 231 and 232 to reduce irregularities in density.

Although the third embodiment was described as the lookup table comprising three tables selectively used for the (3n−2)nd line, the (3n−1)st line, and the 3n-th line, this is not restrictive. The values in these tables are not restrictive, either.

Although the embodiments of the present invention have been described as using ink jet heads for printing various shades by controlling the power application time and thereby varying the volume of ejected ink, this is not restrictive and so-called multidrop types of ink jet heads may be used which eject a plurality of droplets of ink of the same volume and control the number of the droplets of ink ejected onto paper. In addition, the 8-shade printing and the 16-shade printing are merely exemplary.

Moreover, although the embodiments of the present invention have been described as constructing one ink jet head from three head units, this is not restrictive. Two or more than three head units may be used to form one ink jet head.

Furthermore, although the embodiments of the present invention have been described as reducing irregularities in density resulting from increased volume of ejected ink from ending ink chambers of a head unit, the inventive printing control can readily be can used to make provision for irregularities in density resulting from reduced volume of ejected ink from ending ink chambers of a head unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ink jet recording apparatus comprising:
   an ink jet head formed from a plurality of head units each having a large number of ink nozzles arranged in a line, the head units being arranged such that they are substantially parallel to one another in the direction of arrangement of their ink nozzles and, in the direction in which a recording medium moves, every two adjacent head units overlap with each other by a number Q of ink nozzles including a number P (Q>P>1) of ending ink nozzles that may cause a change in printing density; and
   drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged;
      wherein the driving means controls the ink jet head so that one dot is formed by ink ejection from each ink nozzle of one head unit in the overlapping zone of the adjacent head units and the corresponding one of the other head unit and the ratio in the amount of ejected ink of one to the other of overlapping ink nozzles is made variable so that the average printing density in the overlapping zone of the head units varies at a fixed rate; and
      wherein the amount of ejected ink from the one of the overlapping ink nozzles is smaller as it is closer to the end of its corresponding head unit.

2. An ink jet recording apparatus comprising:
   an ink jet head formed from a plurality of head units each having a large number of ink nozzles arranged in a line, the head units being arranged such that they are substantially parallel to one another in the direction of arrangement of their ink nozzles and, in the direction in which a recording medium moves, every two adjacent head units overlap with each other by a number Q of ink nozzles including a number P (Q>P>1) of ending ink nozzles that may cause a change in printing density; and
   drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged;
      wherein the driving means controls the ink jet head so that one dot is formed by ink ejection from each ink nozzle of one head unit in the overlapping zone of the adjacent head units and the corresponding one of the other head unit and the ratio in the amount of ejected ink of one to the other of overlapping ink nozzles is made variable so that the average printing density in the overlapping zone of the head units varies at a fixed rate; and
      wherein, in the direction perpendicular to the line direction, the amount of ejected ink of one of the overlapping ink nozzles that is closer to the end of its corresponding head than the other of the overlapping ink nozzles is close to the end of its corresponding head unit is varied in the increasing direction over a predetermined number of successive lines, while the amount of ejected ink of the other of the overlapping ink nozzles is varied in the decreasing direction over the predetermined number of successive lines.

3. An ink jet recording apparatus comprising:
   an ink jet head formed from a plurality of head units each having a large number of ink nozzles arranged in a line, the head units being arranged such that they are substantially parallel to one another in the direction of arrangement of their ink nozzles and, in the direction in which a recording medium moves, every two adjacent head units overlap with each other by a number Q of ink nozzles including a number P (Q>P>1) of ending ink nozzles that may cause a change in printing density; and
   drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged;
      wherein the driving means controls the ink jet head so that one dot is formed by ink ejection from each ink nozzle of one head unit in the overlapping zone of the adjacent head units and the corresponding one of the other head unit and the ratio in the amount of ejected ink of one to the other of overlapping ink nozzles is made variable so that the average printing density in the overlapping zone of the head units varies at a fixed rate; and ink nozzles including a number P (Q>P>1) of ending ink nozzles that may cause a change in printing density; and
   drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged;

wherein the driving means controls the ink jet head so that one dot is formed by ink ejection from each ink nozzle of one head unit in the overlapping zone of the adjacent head units and the corresponding one of the other head unit and the ratio in the amount of ejected ink of one to the other of overlapping ink nozzles is made variable so that the average printing density in the overlapping zone of the head units varies at a fixed rate; and wherein the drive means includes:
decision means for deciding whether a line direction position signal represents the overlapping zone of first and second adjacent head units;
a table for storing first and second output shade levels of overlapping ink nozzles in the overlapping zone of the first and second head units, the first and second output shade levels being defined with respect to the line direction in which the ink nozzles are arranged and the paper feed direction perpendicular to the line direction for each of shade levels of the input image signal;
first and second shift registers connected with the table when the line direction position signal represents the overlapping zone of the first and second head units for having first and second output levels corresponding to a shade level of the input image signal set, respectively, from the table; and
first and second driver circuits for driving the first and second head units, respectively, in accordance with the first and second output levels set in the first and second shift registers.

4. The ink jet recording apparatus according to claim 3, wherein the ratio in the amount of ejected ink of one to the other of overlapping ink nozzles is made variable in the line direction.

5. The ink jet recording apparatus according to claim 3, wherein the amount of ejected ink from the one of the overlapping ink nozzles is smaller as it is closer to the end of its corresponding head unit.

6. An ink jet recording apparatus comprising:
an ink jet head formed from a plurality of head units each having a large number of ink nozzles arranged in a line, the head units being arranged such that they are substantially parallel to one another in the direction of arrangement of their ink nozzles and, in the direction in which a recording medium moves, every two adjacent head units overlap with each other by a number Q of one another in the direction of arrangement of their ink nozzles and, in the direction in which a recording medium moves, every two adjacent head units overlap with each other by a number Q of ink nozzles including a number P (Q>P>1) of ending ink nozzles that may cause a change in printing density; and drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged;

wherein the driving means controls the ink jet head so that one dot is formed by ink ejection from each ink nozzle of one head unit in the overlapping zone of the adjacent head units and ink ejection from the corresponding one of the other head unit and the ratio in the amount of ejected ink of one to the other of overlapping ink nozzles is made variable so that the average printing density in the overlapping zone of the head units is made substantially equal to the average density in the non-overlapping zones; and wherein the drive means includes:
decision means for deciding whether a line direction position signal represents the overlapping zone of first and second adjacent head units;
a table for storing first and second output shade levels of overlapping ink nozzles in the overlapping zone of the first and second head units, the first and second output shade levels being defined with respect to the line direction for each of shade levels of the input image signal;
first and second shift registers connected with the table when the line direction position signal represents the overlapping zone of the first and second head units for having first and second output levels corresponding to a shade level of the input image signal set, respectively, from the table; and
first and second driver circuits for driving the first and second head units, respectively, in accordance with the first and second output levels set in the first and second shift registers.

7. The ink jet recording apparatus according to claim 6, wherein the ratio in the amount of ejected ink of one to the other of overlapping ink nozzles is made variable in the direction perpendicular to the line direction.

8. The ink jet recording apparatus according to claim 6, wherein, in the direction perpendicular to the line direction, the amount of ejected ink of one of the overlapping ink nozzles that is closer to the end of its corresponding head than the other of the overlapping ink nozzles is close to the end of its corresponding head unit is varied in the increasing direction over a predetermined number of successive lines, while the amount of ejected ink of the other of the overlapping ink nozzles is varied in the decreasing direction over the predetermined number of successive lines.

9. An ink jet recording apparatus comprising:
an ink jet head formed from a plurality of head units each having a large number of ink nozzles arranged in a line, the head units being arranged such that they are substantially parallel to one another in the direction of arrangement of their ink nozzles and, in the direction in which a recording medium moves, every two adjacent head units overlap with each other by a number Q of ink nozzles including a number P (Q>P>1) of ending ink nozzles that may cause a change in printing density; and drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged;

wherein the driving means controls the ink jet head so that one dot is formed by ink ejection from each ink nozzle of one head unit in the overlapping zone of the adjacent head units and ink ejection from the corresponding one of the other head unit and the ratio in the amount of ejected ink of one to the other of overlapping ink nozzles is made variable so that the average printing density in the overlapping zone of the head units is made substantially equal to the average density in the non-overlapping zones; and wherein the amounts of ejected ink from overlapping ink nozzles in the overlapping zone of the head units are made variable so that their total alternates increase and decrease in the line direction.

10. The ink jet recording apparatus according to claim 9, wherein the first position for the total of amounts of ejected ink from overlapping ink nozzles to alternate increase and decrease in the line direction is varied in the direction perpendicular to the line direction.

11. An ink jet recording apparatus comprising:

an ink jet head formed from a plurality of head units each having a large number of ink nozzles arranged in a line, the head units being arranged such that they are substantially parallel to wherein the drive means includes:
  decision means for deciding whether a line direction position signal represents the overlapping zone of first and second adjacent head units;
  a table for storing first and second output shade levels of overlapping ink nozzles in the overlapping zone of the first and second head units, the first and second output shade levels being defined with respect to the line direction for each of shade levels of the input image signal;
  first and second shift registers connected with the table when the line direction position signal represents the overlapping zone of the first and second head units for having first and second output levels corresponding to a shade level of the input image signal set, respectively, from the table; and
  first and second driver circuits for driving the first and second head units, respectively, in accordance with the first and second output levels set in the first and second shift registers.

12. The ink jet recording apparatus according to claim 11, wherein the shade levels for overlapping ink nozzles in the table are set variable so that their total increase and decrease in the line direction.

13. An ink jet recording apparatus comprising:

an ink jet head formed from a plurality of head units each having a large number of ink nozzles arranged in a line, the head units being arranged such that they are substantially parallel to one another in the direction of arrangement of their ink nozzles and, in the direction in which a recording medium moves, every two adjacent head units overlap with each other by a number Q of ink nozzles including a number P (Q>P>1) of ending ink nozzles that may cause a change in printing density; and drive means responsive to an input image signal for driving the ink jet head to cause selectively the ink nozzles to eject ink onto the recording medium for printing while moving the recording medium in a direction perpendicular to the line direction in which the ink nozzles of the respective head units are arranged;

wherein the driving means controls the ink jet head so that one dot is formed by ink ejection from each ink nozzle of one head unit in the overlapping zone of the adjacent head units and ink ejection from the corresponding one of the other head unit and the ratio in the amount of ejected ink of one to the other of overlapping ink nozzles is made variable so that the average printing density in the overlapping zone of the head units is made substantially equal to the average density in the non-overlapping zones; and wherein the drive means includes:
  decision means for deciding whether a line direction position signal represents the overlapping zone of first and second adjacent head units;
  a table for storing first and second output shade levels of overlapping ink nozzles in the overlapping zone of the first and second head units, the first and second output shade levels being defined with respect to the line direction in which the ink nozzles are arranged and the paper feed direction perpendicular to the line direction for each of shade levels of the input image signal;
  first and second shift registers connected with the table when the line direction position signal represents the overlapping zone of the first and second head units for having first and second output levels corresponding to a shade level of the input image signal set, respectively, from the table; and
  first and second driver circuits for driving the first and second head units, respectively, in accordance with the first and second output levels set in the first and second shift registers.

14. The ink jet recording apparatus according to claim 13, wherein the shade levels of overlapping ink nozzles are set variable so that their total alternates increase and decrease in the line direction, and the first position for the total of shade levels of overlapping ink nozzles to alternate increase and decrease in the line direction is varied in the direction perpendicular to the line direction.

* * * * *